US005743492A

United States Patent [19]

Chan et al.

[11] Patent Number: 5,743,492
[45] Date of Patent: Apr. 28, 1998

[54] PAYLOAD HOUSING AND ASSEMBLY JOINT FOR A LAUNCH VEHICLE

[75] Inventors: Allan L. Chan, Pleasanton; Robert M. Heath, Sunnyvale; Steven D. Mettler, Santa Clara; Chau N. Pham, Milpitas; Douglas B. Pereyda, Los Gatos; Robert J. MacDonald; Kenneth W. Epstein, both of San Jose; David P. Kennon, Saratoga, all of Calif.

[73] Assignee: Lockheed Martin Corporation, Bethesda, Md.

[21] Appl. No.: 511,170

[22] Filed: Aug. 4, 1995

Related U.S. Application Data

[63] Continuation-in-part of Ser. No. 198,818, Feb. 18, 1994, Pat. No. 5,529,264.
[51] Int. Cl.$^6$ ............................. B64G 1/22; B64F 1/04
[52] U.S. Cl. ..................... 244/118.2; 244/63; 244/121; 244/158 R; 244/131; 102/275.5; 102/274; 102/378
[58] Field of Search ........................ 244/158 R, 121, 244/122 AF, 63, 131, 118.2; 102/377, 378, 272, 274, 275.5; 267/174, 176; 89/1.14

[56] References Cited

U.S. PATENT DOCUMENTS

| H1082 | 8/1992 | Andrew . |
| 2,604,045 | 7/1952 | Arnold . |
| 3,199,455 | 8/1965 | Samms . |

(List continued on next page.)

OTHER PUBLICATIONS

George P. Sutton, "Choosing a Rocket Engine" Space/Aeronautics—Dec. 1968.
Jack M. Vogel, "The Pocket Rocket Reader" date unknown.
Howard Trudeau "Lockheed Launch Vehicles" Apr. 1993.
Martin Marietta "Titan III Commercial Launch Services" 1987.
S. O. Perry and J. R. Clark "Space Research Vehicle Systems Developed from NASA Scout", Aug. 1959.

(List continued on next page.)

*Primary Examiner*—Virna Lissi Mojica
*Attorney, Agent, or Firm*—Holme Roberts & Owen

[57] ABSTRACT

A launch vehicle payload housing and assembly joint for a launch vehicle, the housing comprising a shroud having first and second shell sections, and a frusto-conical payload adapter mounted in the shroud. The shell sections are connected together to form a housing. A peripherally extending explosive seam and a pair of longitudinally extending explosive seams hold the shell sections together. Each seam comprises a plurality of seam elements which include a pair of brackets attached to opposed ends of those parts of the shell abutting the longitudinally and peripherally extending seams. The brackets are spaced from one another to define a cavity. The cavity accommodates a deformable tube which houses explosive material in the form of an explosive cord. Detonation of the explosive material causes the shell sections to separate from one another. Longitudinally acting thrustor springs and transverse acting assistor springs urge the shell sections apart to pivot about hinges between the shell sections and a base ring. The hinges comprise brackets which are separable from one another when the shell sections are in their separated open state. This allows the shell sections automatically to be discarded once fully opened. The assembly joint for connecting a shroud and a payload adapter to a final stage motor of a launch vehicle comprises a flange defined by a lower end of a wall of the shroud, an adapter bracket secured to a lower end of the adapter, the adapter bracket defining a flange aligned with the flange of the shroud wall, and a motor bracket secured to an outer wall of the final stage motor. The motor defines a flange aligned with the flange of the adapter bracket. The three flanges define axially extending aligned holes for receiving bolts to secure the flanges to one another.

19 Claims, 19 Drawing Sheets

U.S. PATENT DOCUMENTS

| | | |
|---|---|---|
| 3,357,356 | 12/1967 | Bischoff . |
| 3,362,290 | 1/1968 | Carr et al. . |
| 3,453,960 | 7/1969 | Qualls . |
| 4,796,839 | 1/1989 | Davis . |
| 4,867,357 | 9/1989 | Inglis et al. . |
| 4,964,340 | 10/1990 | Daniels et al. . |
| 5,046,426 | 9/1991 | Julien et al. . |
| 5,072,896 | 12/1991 | McIntyre et al. . |
| 5,104,067 | 4/1992 | McIntyre et al. . |
| 5,129,602 | 7/1992 | Leonard . |
| 5,141,181 | 8/1992 | Leonard . |
| 5,143,328 | 9/1992 | Leonard . |
| 5,167,386 | 12/1992 | Laquer et al. . |
| 5,172,875 | 12/1992 | Fried . |
| 5,203,844 | 4/1993 | Leonard . |
| 5,217,188 | 6/1993 | Thole . |
| 5,228,642 | 7/1993 | Bright . |
| 5,529,264 | 6/1996 | Bedegrew et al. ............. 244/118.2 |

OTHER PUBLICATIONS

Mark H. Daniels and James E. Davidson Conestoga Launch Vehicles: pp. 186 to 191 Aug. 1987 AIAA/DARPA Meeting on Lightweight Satellite Systems.

Michael D. Griffin and Joseph H. Jerger "Preliminary Design of the Industrial Launch Vehicle" pp. 241–247 AIAA/DARPA Meeting on lightweight satellite systems. Aug. 1987.

Norman E. Grizzell "Application of Fleet Ballistic Missile Components/Designs for Expendable Launch Vehicles" pp. 255–263 Aug. 1987 AIAA/DARPA Meeting on lightweight satellite systems.

E Prime Aerospace Corporation—EPAC S–1 and S–11 Payload User's Manual Nov. 29, 1988.

NASA Facts—An educational services publication of the National Aeronautics and Space Administration—"United States Launch Vehicles for Peaceful Exploration of Space" vol. II, No. 5 Supplement—date unknown.

"All Solids Medium Launch Vehicle" publication No. 87193 Morton Thiokol, Inc. Oct. 16, 1986.

"Payload Launch Systems" Lockheed Aug. 1987.

7th Annual AIAA—Utah State University Conference on Small Satellits—Lockheed Missiles & Space Company, Inc. D.E. Davis, J.W. Angeli, A.J. MacLaren, Sep. 13–16, 1993.

"International Aerospace Abstracts—Space Transportation Options and Opportunities" AIAA Library J.P. Loftus, Jr., R.C. Ried, R.B. Bristow 1987.

"Conestoga II—A Low Cost Commercial Space Transport System" Second symposium on Space Industrialization—NASA Publication 2313 pp. 169–172, 177–180, 184, 186, 189. Richard Rasmussen Feb. 1989.

"Expendable Launch Vehicles Technology" Report to the US Senate and House of Representatives—NASA Library—Jul. 1990.

"Understanding Rockets ant Their Propulsion" pp. 25–36 Craig Kuentz—Apr. 1964.

"From Earth to Orbit—An Assessment of Transportation Options" National Academy Press, Washington D.C. 1992 NASA S&T Library Committee on Earth–to–Orbit Transportation Options, Aeronautics and Space Engineering Board, Commission on Engineering and Technical Systems, National Research Council.

"Assessment of Candidate Expendable Launch Vehicles for Large Payloads" National Academy Press, Washington D.C., Sep. 1984 Committee on NASA Scientific and Technological Program REviews; Commission on Engineering and Technical Systems; National Research Council.

"US Access to Space—Launch Vehicle Choices for 1990–2010" Scott Pace—A Project Air Force Report—Mar. 1990.

"Guide to ELV's and the Commercial Launch Market" —Space Business News Staff 1986.

"Assured Access to Space 1986" Hearings before the Subcommittee on Space Science and Applications No. 164—Donald K. Slayton 1987.

"Launch Options for the Future—Special Report" U.S. Congress, Office of Technology Assessment—Jul. 1988.

"Reducing Launch Operations Costs—New Technologies and Practices" Congress of the United States. Library of Congress Catalog No. 88–600539 Sep. 1988.

National Space Launch Program to Congress—NASA S&T Library Mar. 14, 1989.

Solid Rocket Motor Space Launch Vehicles—43rd Congress of the International Aeronautical Federation, A.J. MacLaren; H.D. Trudeau, Aug. 1992.

Commercial Space Launch Act Jun. 5, 1984.

U.S. Congress Office of Technology Assessment, "Big Dumb Boosters: A Low–Cost Space Transportation Option" (Washington D.C.: US Government Printing Office, Sep. 88).

Letter "Keep Our Rockets Simple" Aerospace America 1987 Mar., 1987.

"Space Technology to Meet Future Needs", Committee on Advanced Space Technology, National Academy Press, Washington D.C. 1987.

U.S. Commercial Space Policy Guidelines Feb. 1991.

E'Prime Aerospace Corporation Oct. 14, 1987.

Super Zip Separations Systems—Fact Sheet—By Lockheed Missiles & Space Company (Date Unknown).

Saab Ericsson Space Technical Data (date unknown) Jan. 1994.

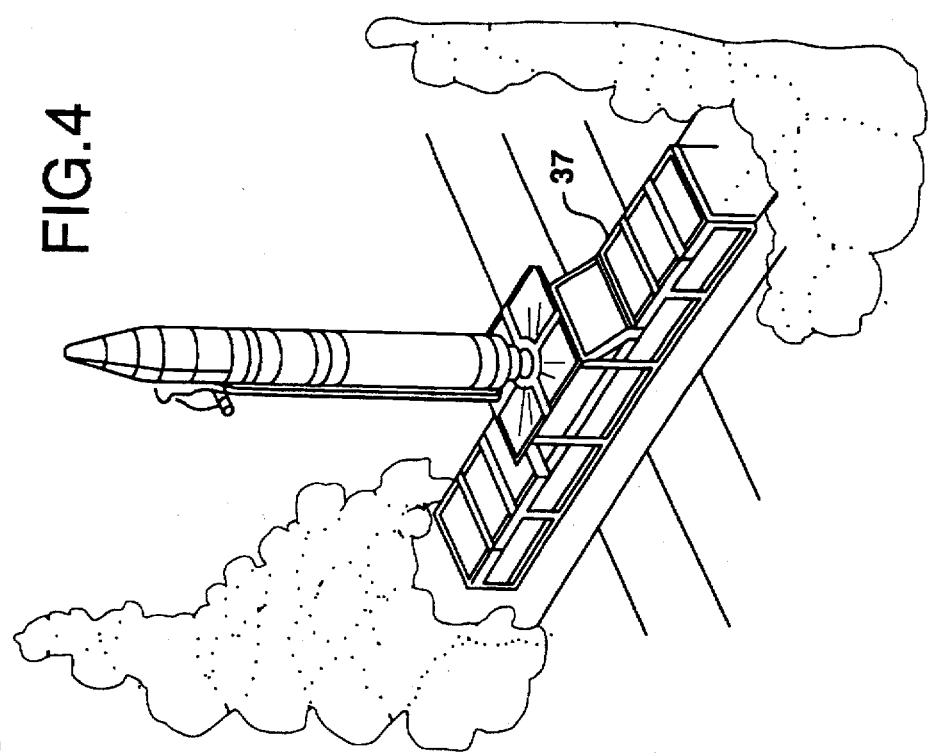
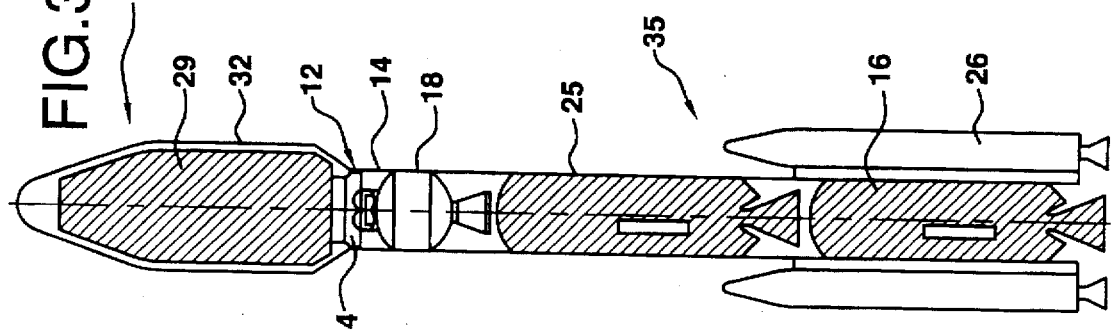
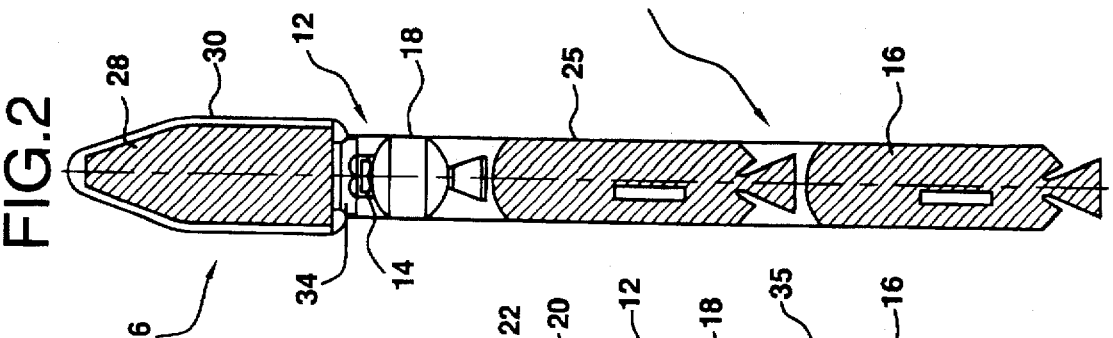
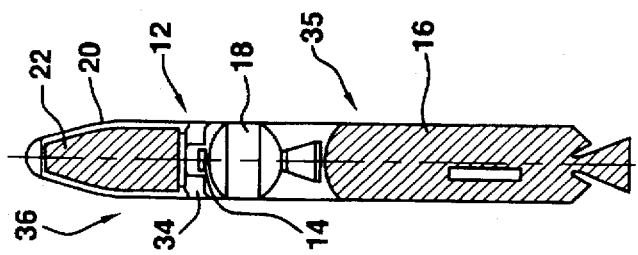

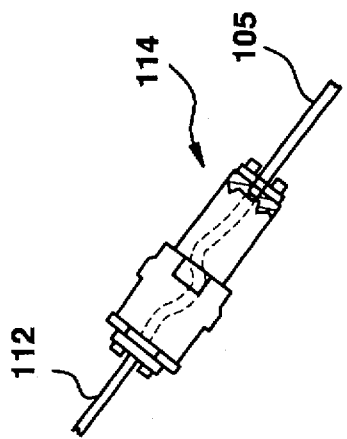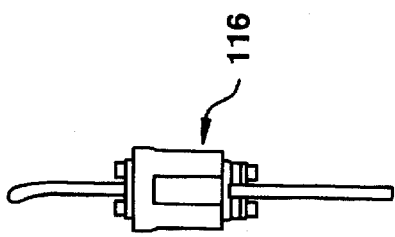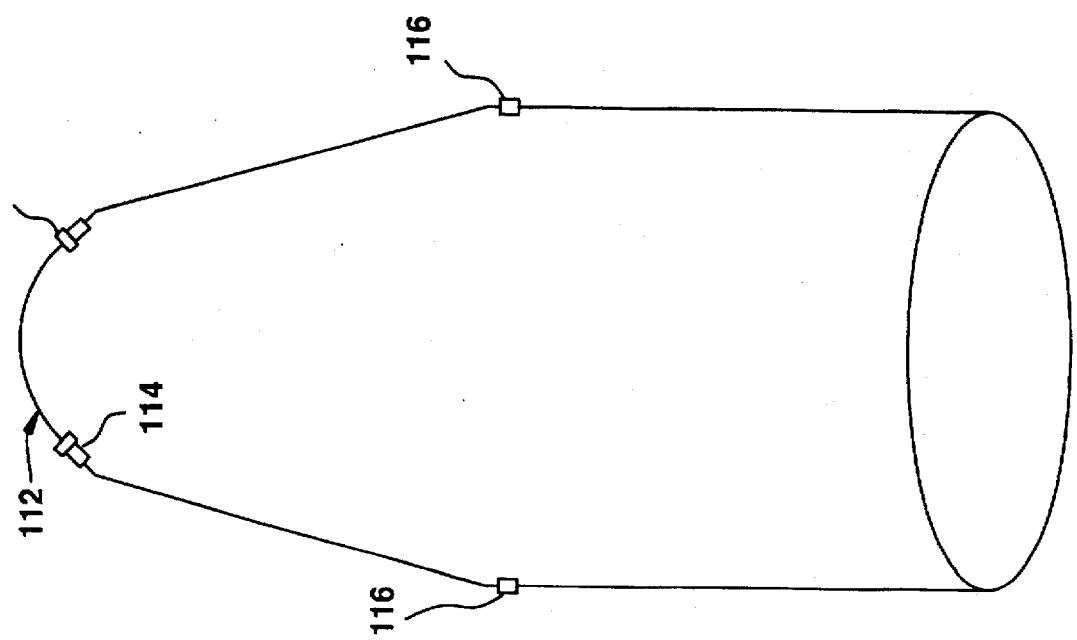

5,743,492

PAYLOAD HOUSING AND ASSEMBLY JOINT FOR A LAUNCH VEHICLE

RELATIONSHIP TO COPENDING APPLICATION

This patent application is a continuation-in-part of U.S. patent application Ser. No. 08/198,818 filed on Feb. 18, 1994 now U.S. Pat. No. 5,529,269.

BACKGROUND OF THE INVENTION

This invention relates to an improved payload assembly. Previous launch vehicles typically required that the entire launch vehicle be fully assembled before a payload is placed in the payload assembly. This caused delays in completing the assembly since placing the payload in the payload receptor assembly and completing the electrical connections between the payload and the launch vehicle could not begin until this late stage.

Furthermore, the size of existing launch vehicle payload receiving areas were generally fixed in size.

OBJECTS AND SUMMARY OF THE INVENTION

It is an object of the invention to provide an improved clam shell shroud for a launch vehicle.

It is a further object of the invention to provide means for removing the shell sections by pivoting them outwardly. Specifically, it is an object of the invention to provide spring means for urging the shell sections apart and to provide separable hinges for releasing the shell sections once opened.

It is a further object of the invention to provide explosive seams for releasably holding the shell sections together. For this purpose, it is an object of the invention to provide the explosive material in the explosive seams in the form of an explosive cord extending within a deformable tube, thus containing the product of the explosion within the tube.

It is also an object of the invention to provide a payload adapter to readily receive a wide variety of payloads.

In summary, the payload assembly of this invention includes a shroud for a launch vehicle comprising a first shell section and a second shell section connected to the first shell section to form a housing having a closed upper end and an open lower end and defining a payload cavity. A base ring is provided upon which the first and second shell sections are mounted. A pair of longitudinally extending explosive seam means extend upwardly in a longitudinal plane from the base ring along opposite sides of the housing between the first and second shell sections for connecting the first and second shell sections. A peripheral explosive seam extends along the periphery of the housing between the base ring and the shell sections in a plane perpendicular to the longitudinal plane.

The device includes hinge means for pivotally securing the shell sections to the base ring, and spring means for exerting an outward force on the shell sections for pivotal movement of the shell sections relative to the base ring. The spring means can comprise at least one pair of thrustor spring assemblies mounted across the peripheral seam, the spring assemblies of each pair being mounted on either side of respective ones of the longitudinally extending explosive seams for exerting a repelling force between the base ring and the shroud sections. The spring means can also include assistor spring means mounted across at least one of the longitudinally extending explosive seams for exerting a repelling force between the two shell sections.

Each thrustor spring means can include at least one spring having an upper end and a lower end, in which the upper end is secured relative to one of the shell sections and in which a thrustor bar is secured to the lower end of the spring, the bar being movably mounted relative to said shell section to engage the base ring thereby to exert a force between the shell section and the base ring. The thrustor bar can have a lower foot complementarily engageable with a support base secured to the base ring. The spring means can include four pairs of thrustor spring assemblies, the pairs being mounted across the peripheral seam, on either side of each of the two longitudinally extending seams.

The assistor spring means can comprise two helical compression springs mounted across the longitudinally extending seams on opposite sides of the housing, each spring having a first and a second end, the first end being secured to one of the shell sections.

The hinge means for each shell section can comprise at least one hinge which includes a first hinge plate having a retaining slot means defined therein; a pivot pin mounted on the first hinge plate; and a second hinge plate having a pivot slot formed therein engageable with the pivot pin, the second plate being pivotable relative to the first plate about the pivot pin between an engaged positioned and a disengaged position, the second plate further including a retaining pin mounted thereon and engageable with the retaining slot means when the second plate is in its engaged position, to retain the pivot slot of the second plate relative to the pivot pin.

The hinge means for each shell section can comprise a pair of hinges, the pivotal axes of the pivot pins lying on a common straight line. The longitudinally extending explosive seams can comprise a plurality of longitudinally extending seam elements, ends of which are connected to one another to form the seams, each element comprising a pair of brackets attached to opposed ends of the first and second shell sections and a pair of opposed plates connecting the brackets. The plates have weakened zones extending longitudinally along the plates. The plates are spaced apart by the brackets, and the brackets are spaced from each other by the plates to define a longitudinally extending cavity. Each longitudinally extending explosive seam further includes a deformable tube extending along the cavities of its elements, explosive material housed in the tubes, and at least one detonating means for detonating the explosive material. The explosive material can take the form of an explosive cord extending within each deformable tube.

The payload assembly of this invention also includes payload adapter means connected to the base ring for supporting a payload. The payload adapter means can comprise a frusto-conical support defined by a frusto-conically shaped wall and having connecting means at its ends for connecting the narrow end of the support to a payload or a secondary adapter, and the wide end of the support to the base ring. Each connecting means can include an annular bracket having a radially outwardly extending flange with axially extending holes defined in the flange and spaced circumferentially along the flange. The frusto-conical support can include at least one air vent extending through the wall of the support.

The payload adapter means can include a contamination shield secured to the smaller diameter side of the support. The shield can include strengthening ribs and define ports to permit communication through the shield.

The connecting means of the frusto-conical support can include means for connecting the wide end of the support to a wall of the launch vehicle. Each connecting means can include an annular bracket having a radially outwardly extending flange with axially extending holes defined in the flange and spaced circumferentially along the flange.

Still further according to the invention there is provided an assembly joint for connecting a shroud and a payload adapter to a final stage motor of a launch vehicle, which comprises a flange defined by a lower end of a wall of the shroud. An adapter bracket is secured to a lower end of the adapter, the bracket defining a flange aligned with the flange of the shroud wall. A motor bracket is secured to an outer wall of the final stage motor, the bracket defining a flange aligned with the flange of the adapter bracket. These three flanges have axially extending, aligned holes for receiving bolts to secure the flanges to one another.

BRIEF DESCRIPTION OF THE DRAWINGS

FIG. 1 is a sectional side view of an LLV1 in accordance with the invention;

FIG. 2 is a sectional side view of an LLV2 in accordance with the invention;

FIG. 3 is a sectional side view of an LLV3 in accordance with the invention;

FIG. 4 is a three-dimensional view of a launch vehicle system and portable platform in accordance with the invention;

FIG. 11 is schematic representation of the path of the explosive material in the explosive seams;

FIG. 12 is a side view of a tube coupling for use in the explosive seam;

FIG. 13 is a side view of a slip joint for use in the explosive seam;

DETAILED DESCRIPTION OF THE INVENTION

Figure 5:
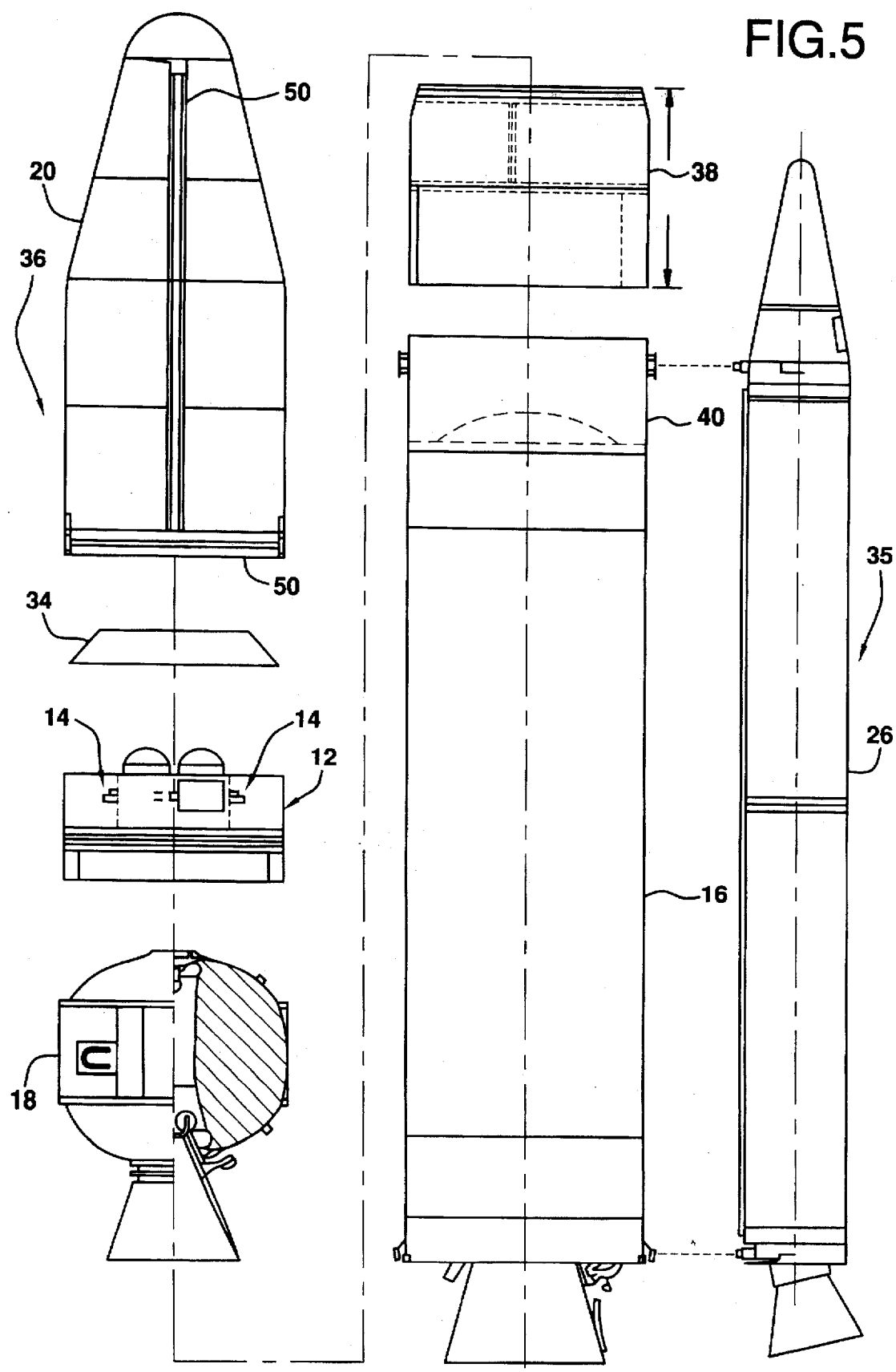
FIG. 5 shows various components of a launch vehicle system in accordance with the invention.

It is thus desirable to have a launch vehicle in which a number of payload carrying portions are interchangeable to accommodate various payload volumes. It is also desirable that the payload carrying portion have electrical connectors allowing it to be stacked on top of the rest of the vehicle and easily connected thereto. This would allow the payload to be loaded into its holding area in the payload carrying portion independent of the assembly stage of the launch vehicle. For greater versatility and in order to allow existing structures to be used in conjunction with new features, a payload adapter is desirable to interface between new and existing launch vehicle structures.

The use of interchangeable launch vehicle sections and the need in the art to assemble the payload carrying portion separately allows certain advantages to be achieved. Since the payload carrying portion need not be secured to the rest of the vehicle when the payload is secured relative thereto, it is possible to first mount the payload onto a payload adapter. A shroud is then placed over the adapter and payload prior to lifting the assembled payload structure with its payload onto the rest of the vehicle. This allows the payload portion and the rest of the vehicle to be assembled independently, thus speeding up the assembly process. However, special steps must be taken to secure the various vehicle portions and to achieve deployment of the payload. The rocket system illustrated in FIGS. 1, 2 and 3 are referred to as the LLV1, LLV2 and LLV3, respectively. Each system is built up in stack-like fashion using standardized modular building blocks. In order to emphasize the use of common building blocks in the three systems, the same reference numerals will be used to refer to the same blocks.

Referring to FIG. 1, the LLV1 system includes an Orbital Assist Module (OAM) 12 having attitude control electronics (not shown) and liquid fuel motors 14. The LLV1 further includes solid fuel rocket motors in the form of a first stage 16 and a final stage 18 on which the OAM is mounted. A payload assembly which includes a shroud 20 (also referred to as a fairing) for housing a payload 22 is mounted on top of the OAM.

The final stage 18 is preferably an Orbus 21D solid fuel rocket motor which is manufactured by the Chemical Systems Division of United Technologies, Inc. In the FIG. 1 embodiment, the final solid fuel stage 18 is mounted on top of the first stage.

The first stage primary solid fuel motor 16 is preferably a 236 centimeter diameter, 889 centimeter long solid fuel rocket motor available from Thiokol under the tradename, Castor 120. It is a 120,000 lbm class motor that employs a graphite epoxy resin case, a class 1.3 HTPB propellent, a pyrogen ignitor, and vectorable carbon-phenolic nozzles driven by a cold gas blow down thrust vector control system.

Referring to FIGS. 2 and 3, the first stages are identical to that of the FIG. 1 embodiment and are, accordingly, indicated by the same reference numeral 16. Both the FIGS. 2 and 3 embodiments further include a second stage 24 is also preferably a Thiokol Corporation Castor 120 solid fuel rocket motor. The only distinction between the first stage 16 and the second stage 24 is that the second stage 24 has a larger expansion ratio nozzle to improve performance at higher altitudes. Furthermore, in order to change the burn characteristics, thereby allowing the thrust of the second stage to be tapered near burn-out to lower vehicle acceleration and provide a smoother ride for the payload, the propellent grain is suitably tailored.

In the LLV2 and LLV3, the final stage 18 is mounted on top of the second stage 24. In all three embodiments, however, the final stage 18 is structurally the same, using a carbon-phenolic nozzle and an electromechanical actuator.

The embodiment illustrated in FIG. 3 (LLV3) further includes strap-on solid fuel motors 26, preferably being Castor IV A motors, to increase the payload carrying capacity.

It is thus clear that, apart from the Orbital Assist Module 12 which includes the liquid fuel motors 14, the propulsion systems of the various embodiments are of a solid fuel variety.

The LLV1, LLV2 and LLV3 differ in the number of motors making up the system. The purpose is to allow payloads of varying size to be carried into orbit. Accordingly different shroud sizes are provided to accommodate the different payloads 22, 28, 29 shown for the LLV1, LLV2 and LLV3, respectively. As appears from FIGS. 1, 2 and 3, the shroud 30 of FIG. 2 is larger than the shroud 20 of FIG. 1, but is in turn smaller than the shroud 32 of FIG. 3. While the shrouds 20, 30, 32 are shown specifically for the LLV1, LLV2 and LLV3, respectively, they are interchangeable. The relevant criteria regarding choice of propulsion system and size of shroud are size and mass of the payload.

In each of the three embodiments illustrated in FIGS. 1 to 3 the attitude control system is mounted on top of the final stage 18 and is connected to a shroud, as is discussed in greater detail below. A payload adapter 34 (discussed below), is provided to mount the payload in its shroud.

The modular system described above allows a stack-and-shoot approach to be adopted during assembly. The solid fuel motors are simply secured together to provide a propulsion system suitable to launch the payload in question.

The rocket system may be considered as consisting of two broad sections: the propulsion system 35, consisting of the solid and liquid fuel motors; and the payload assembly 36 comprising a shroud for housing a payload, and a payload adapter 34.

As mentioned above, the use of different propulsion systems for the various embodiments provides for different payload carrying capacities. The payload requirements, in turn, account for the different shroud configurations.

The smallest vehicle (LLV1) (illustrated in FIG. 1) is capable of placing up to 2200 pounds into a low earth orbit (LEO) of 100 nautical miles at 28°. The next increment, (LLV2) (FIG. 2) is capable of placing 2200 to 4000 pounds into LEO, and the LLV3 can place 4000 to 8000 pounds into LEO, depending upon the number of strap-on motors 26. Strap-on motors 26 are added in quantities of 2, 3, 4 and 6 to provide performance increases of 1400, 660, 600 and 1100 lb, respectively.

This rocket system configuration provides a number of advantages. The use of solid fuel motors, for instance, permits a stack-and-shoot approach to be adopted. When used in conjunction with a mobile launch system check-out van (not shown), launch operations are even possible from a portable launch platform 37 (FIG. 4). This approach allows the propulsion system and payload assembly to be independently and concurrently assembled, thereafter simply to be mated to each other.

Each part of the rocket system will now be described in greater detail.

FIG. 5 gives an overview of the various components making up the rocket system, which are shown here in a dismantled state for purposes of clarity. In particular, FIG. 5 shows the propulsion system 35, comprising a first stage 16, a strap-on motor 26, a final stage solid fuel motor 18, an interstage 38 and a connecting ring 40. The illustration further shows the fairing or shroud 20, the payload adapter 34 and the Orbital Assist Module 12 with its liquid fuel motors 14.

Three LLV shrouds or fairings, ranging from the 92-inch-diameter shroud 20 having a length of 240.5 inches, (shown in FIG. 1), to the 141 inch shroud 32 (FIG. 3), are proposed. While the small shroud 20 can be used on all configurations, it has been determined that the LLV1 is not ideally suited for the larger shrouds 30, 32 for aerodynamic reasons. It will be appreciated that the larger shrouds have the advantage that satellite packaging requirements for deployables such as solar arrays and antennas is simplified. The largest size shroud 32 can enclose a satellite as large as a STAR 63, capable of geosynchronous transfer orbit (GTO) or interplanetary missions. The increased weight and drag of the larger shrouds, however, results in a small performance penalty. It is therefore desirable to choose the smallest shroud that will enclose a particular satellite.

Figure 6:
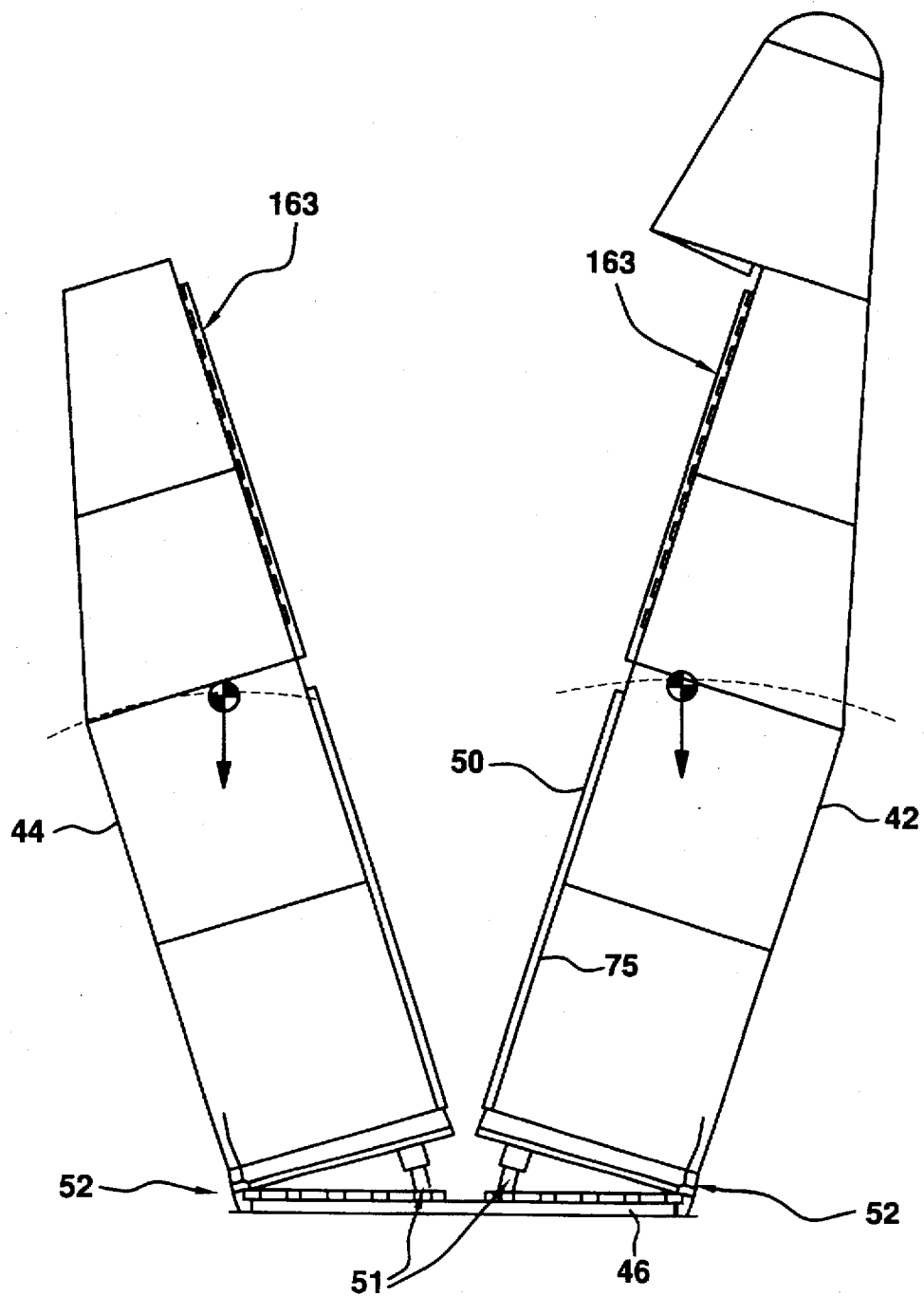
FIG. 6 is a side view of a shroud in accordance with the invention, showing the shroud in a partially opened state.

FIG. 6 shows a clam shell shroud 20 made of two shell sections 42, 44 which are pivotally secured to a base ring 46. Prior to pivotal separation of the shell sections 42,44 they are connected to each other by zip-like explosive seams 50.

When activated, the seams 50 allow the two shell sections 42, 44 to be separated from each other and from the rest of the system. As is described in greater detail below, thrustor springs 51 located at the shroud base provide appropriate separation forces by pushing vertically to cause rotation about hinges 52 mounted between the sections 42, 44 and the base ring 46. This minimizes the breathing mode at separation, a characteristic of two piece clam shells. The shrouds are further equipped with access doors 53 and RF windows (not shown) located in accordance with the satellite requirements.

Figure 7:
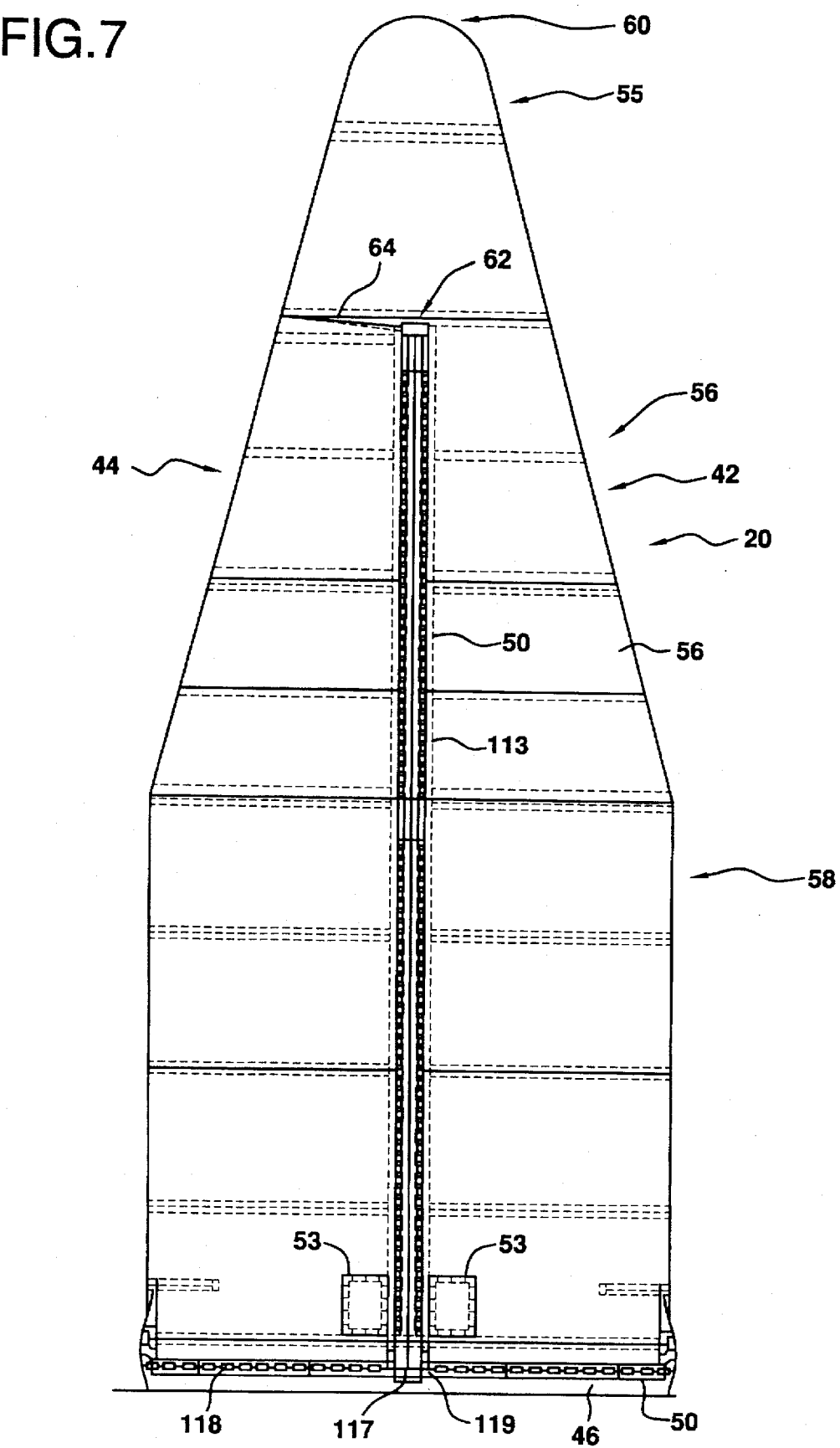
FIG. 7 is a side view of the shroud.

As is shown more clearly in FIG. 7, the shroud 20 is defined by walls 54 made of aluminum. The walls define a nose cone 55, a conic section 56, a barrel section 58, and the lower base ring 46. The nose cone 55 is made of aluminum sheeting and comprises an upper and a lower portion. The conic section 56 is also made of aluminum sheeting and is provided with rolled ring forgings bolted to the inner surface of the conic section for greater structural support.

The barrel section 58 is made of aluminum sheeting with a rolled ring forging, aluminum extrusion stretch-formed support rings and aluminum extrusion stretch-formed splice rings. In contrast, the shrouds 30, 32 have a composite sandwich construction.

Figure 8:
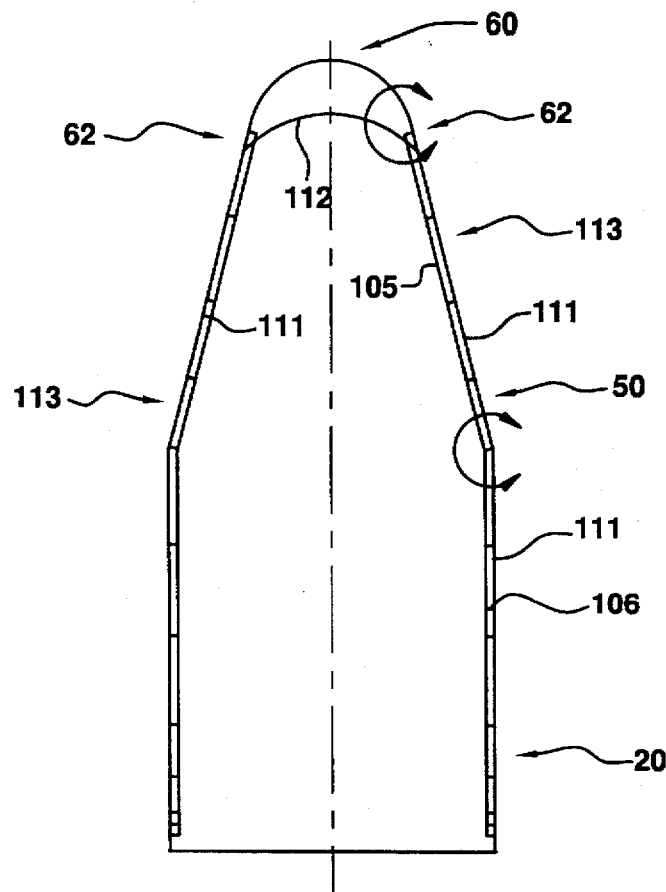
FIG. 8 is a sectional side view of the shroud.

As mentioned above, the shroud 20 comprises two clam-like sections 42, 44. The zip-like explosive seam 50 extends vertically along opposite sides of the shroud wall 54 between the sections 42, 44 and circumferentially to connect the sections 42, 44 to the base ring 46 of the shroud 20. Near the leading end 60 of the shroud 20, the vertically extending explosive seams 50 are terminated. Between these upper termination points 62 of the seams 50, the sections 42, 44 abut a silicon rubber sealing tube 64. Referring to FIG. 8, the schematic cross-sectional representation of the fairing 20 shows the configuration of the explosive seam 50.

Figure 9:
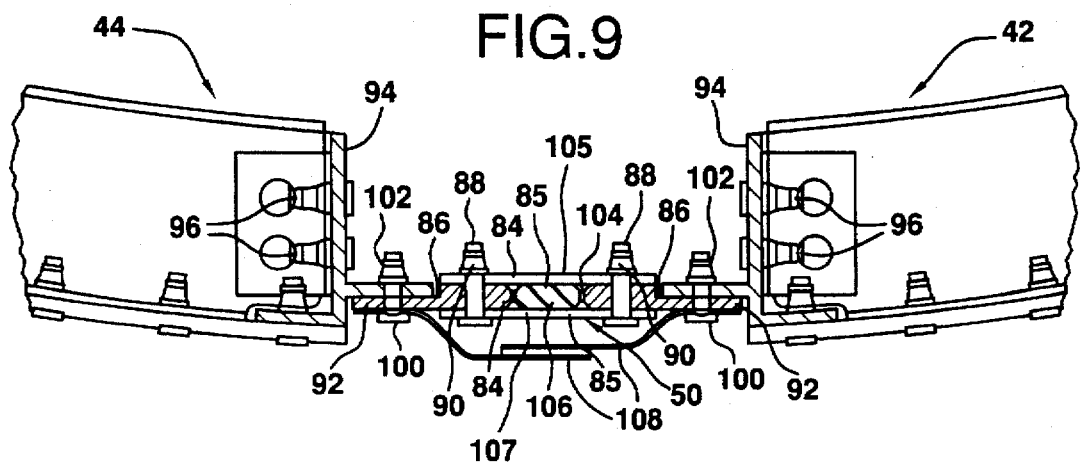
FIG. 9 is a detailed sectional plan view of a longitudinally extending explosive seam for use in the launch vehicle, in accordance with the invention.
Figure 10:
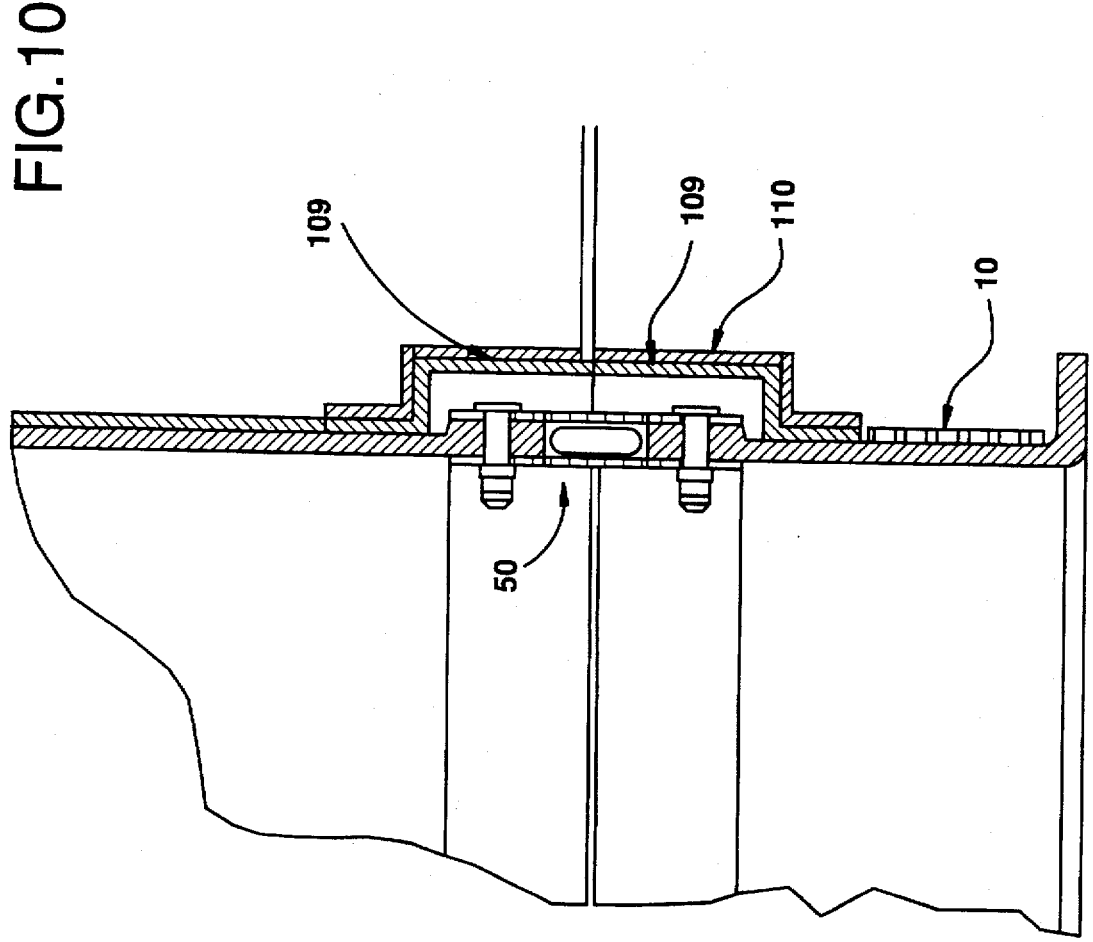
FIG. 10 is a sectional side view of a circumferentially extending explosive seam.

A more detailed cross-sectional view of the seam 50 is shown in FIG. 9. The seam 50 comprises elongate housings, each in the form of opposed plates 84 having longitudinally extending scoring lines 85. The plates 84 are spaced from one another by means of separation plates 86. Bolts 88 extend through aligned holes in the plates 84 and the plates 86, and are secured by means of internal nuts 90. The plates 86 extend outwardly in the form of longitudinally extending flange formations 92 which permit the plates 86 to be secured to complementary brackets 94. The brackets 94 are, in turn, bolted to the shroud wall 66 by means of bolts 96. The flange formations 92 abut complementary, inwardly extending portions of the brackets 94. The flange formations 92 and the brackets 94 are provided with complementary aligned holes, thereby allowing the plates 86 to be secured to the brackets 94 by means of bolts 100 and nuts 102. Intermediate the inner ends of the plates 86 and the inner surfaces of the plates 84, a channel-like housing 104 is defined, in which is housed a deformable stainless steel tube 105. The tube 105 contains an explosive material 106 in the form of a cord embedded in a silicon rubber matrix. The cord has 9.5 grains per foot of explosive. Typically a second redundant explosive cord is provided. A cover in the form of a second pair of outer brackets 108 is secured to the plates 86 by means of the bolts 100 and nuts 102. The plates 108 overlap one another and are frangibly secured to each other to shield the inner plates 84 prior to detonation of the explosive material 106. Another embodiment of the cover is shown in FIG. 10 for the circumferentially extending seam 50. The cover comprises upper and lower aluminum plates 109 which form an insulating housing over the seam 50. A cork layer 110 provides insulation. Referring again to FIG. 8, the explosive material 106 extends longitudinally along the tubes 105 of the seams 50. The tubes 105 are formed in sections 111. As is shown in FIGS. 8 and 11, a tube section 112 crosses over to join the two termination points 62 of the longitudinally extending portions 113 of the explosive seams 50 at the upper ends of the seams 50. The tube section 112 is connected to the deformable tube 105 by means of a tube coupling 114 illustrated in greater detail in FIG. 12. The couplings 114 provide a housing for storage of a length of detonation material 106. This accommodates thermal expansion and structural tolerances. The couplings 114 are secured to the walls 54 by means of brackets. Thermal expansion and structural tolerances are also accommodated by means of slip joints 116 shown in detail in FIG. 13.

Referring to FIG. 7, a pair of detonators 117 serve to detonate the circumferentially extending portion 118 of the seam 50. Detonators 119 detonate the longitudinal portions 113. These will be described in greater detail below.

When the explosive material 106 is detonated the deformable tube 105 expands outwardly to exert rupturing forces on the plates 84 causing the plates 84 to rupture along the scoring lines 85 thereby permitting separation of the opposite sections 42, 44 of the shroud 20. The scoring lines 85 thus define frangible connections holding the sections 42, 44 together. Once the explosive material 106 is detonated, the sections 42, 44 separate under the action of the thrustor springs (not shown) and assistor springs (not shown), as is described in greater detail below. The explosive waste material is contained within the tube 105 thereby avoiding contamination of sensitive equipment.

Figure 16:
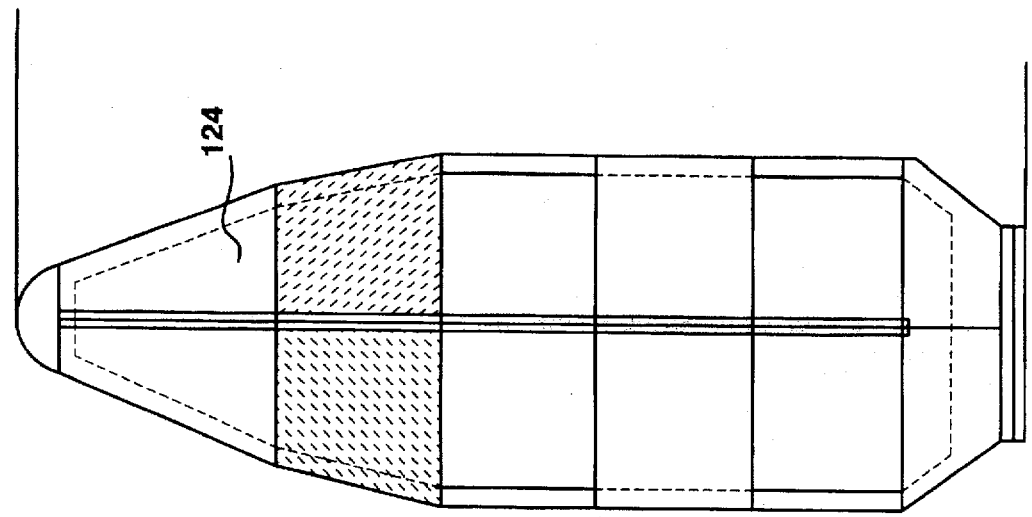
FIG. 16 is a side view of a 141 inch diameter shroud.
Figure 15:
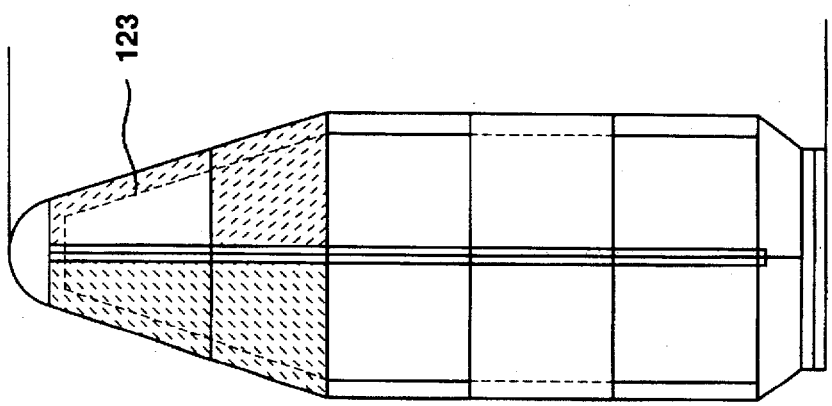
FIG. 15 is a side view of a 116 inch diameter shroud.
Figure 14:
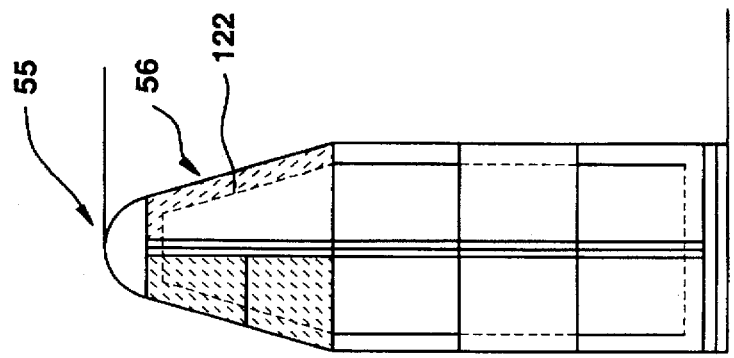
FIG. 14 is a side view of a 92 inch diameter shroud.

As is illustrated in FIG. 14, the outer surface of the wall 54 at the upper portion of the shroud 20, is covered by an insulating cork lining 122 which thermally protects the shroud 20. The configuration of the cork lining is illustrated in FIGS. 14, 15 and 16 for the LLV1, LLV2, LLV3, respectively, and is indicated by reference numerals 122, 123 and 124, respectively.

Means for assisting in the removal of the shroud sections 42, 44 are shown in FIGS. 17 to 26.

Figure 17:
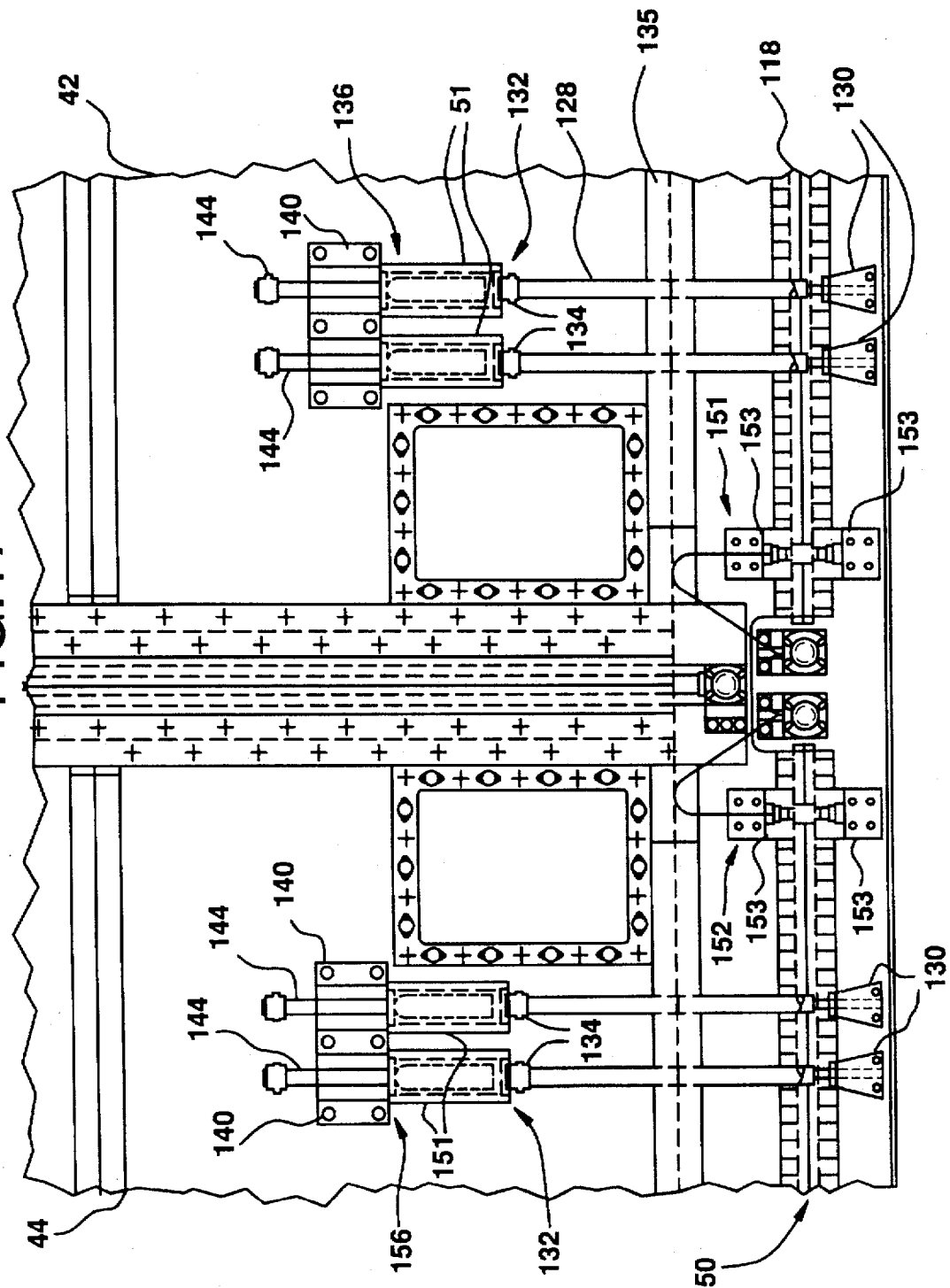
FIG. 17 is a front view of a thrustor spring arrangement for use with the shroud.
Figure 18:
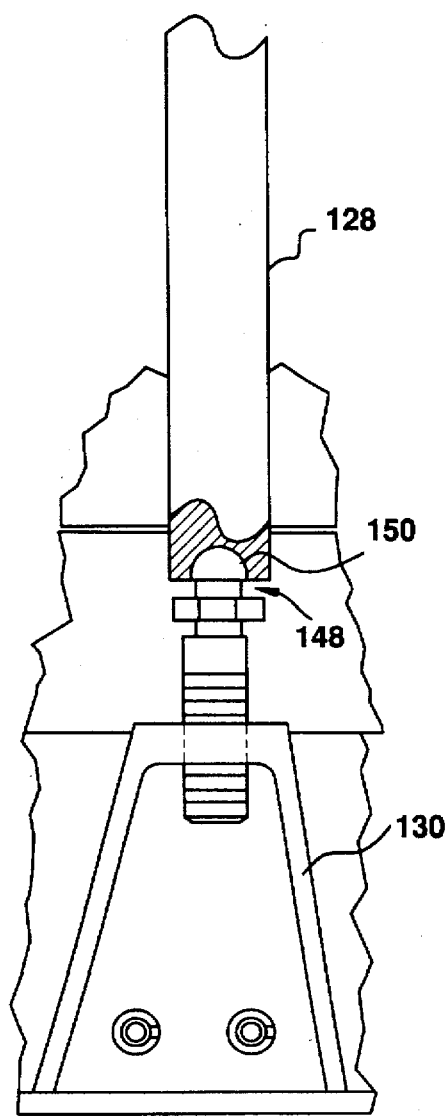
FIG. 18 is a detailed front view of part of the thrustor spring arrangement in an unactivated state.
Figure 19:
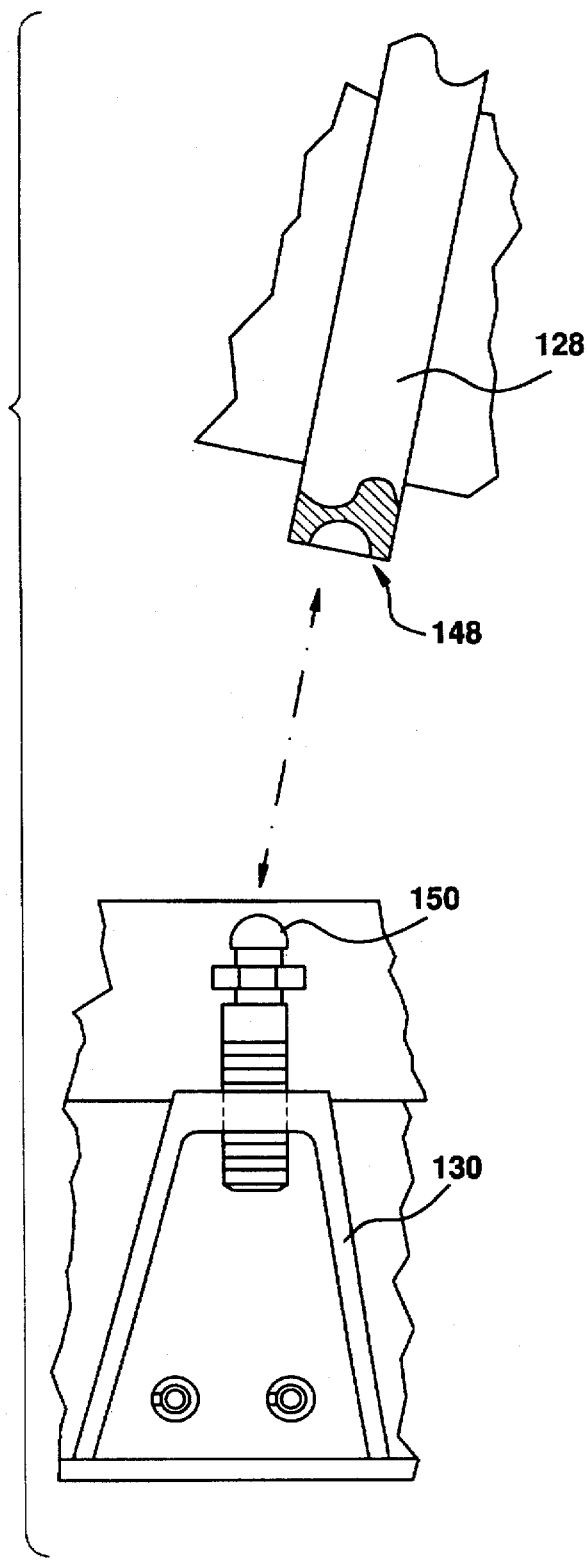
FIG. 19 is a detailed front view of the part of the thrustor spring arrangement of FIG. 18, in an activated state.

Once the explosion has taken place, the thrustor springs 51, illustrated in FIG. 17 assist in separating the sections 42, 44. The springs 51 are provided with thrustor bars 128 extending from operatively lower portions of the springs 51 to engage with brackets 130. The lower ends 132 of the springs 51 are immovably held relative to the bars 128 by means of stop formations 134 and the bars 128 are slidably mounted on the shroud 20 by means of lower support brackets 135. The upper ends 136 of the springs 51 engage brackets 140 which are secured to the walls 54. The springs 51 thus exert a force between the brackets 130 and the brackets 140. Support rods 144 are connected to the bars 128 and serve to support the springs 51. The rods 144 are slidably mounted relative to the brackets 140 and allow the brackets 140 to move up on the rods 144. It will be appreciated that the thrustor bars 128 bridge the frangible junction of the circumferentially extending portion 118 of the seams 50. Thus, when the explosion occurs and the seams 50 rupture, the force of the compression springs 51 propels the sections 42, 44 upwardly due to the force of the springs 51 acting between the brackets 140 and the brackets 130. The thrusting action is illustrated in greater detail in FIGS. 18 and 19. The thrustor bars 128 each has a concave depression on its lower surface 148. The depressions engage complementary convex-headed bolts 150 retained in the brackets 130. This ensures that no slipping occurs between the bars 128 and the brackets 130 when the springs 51 propel the sections 42, 44 upwardly relative to the base ring 76.

Figure 20:
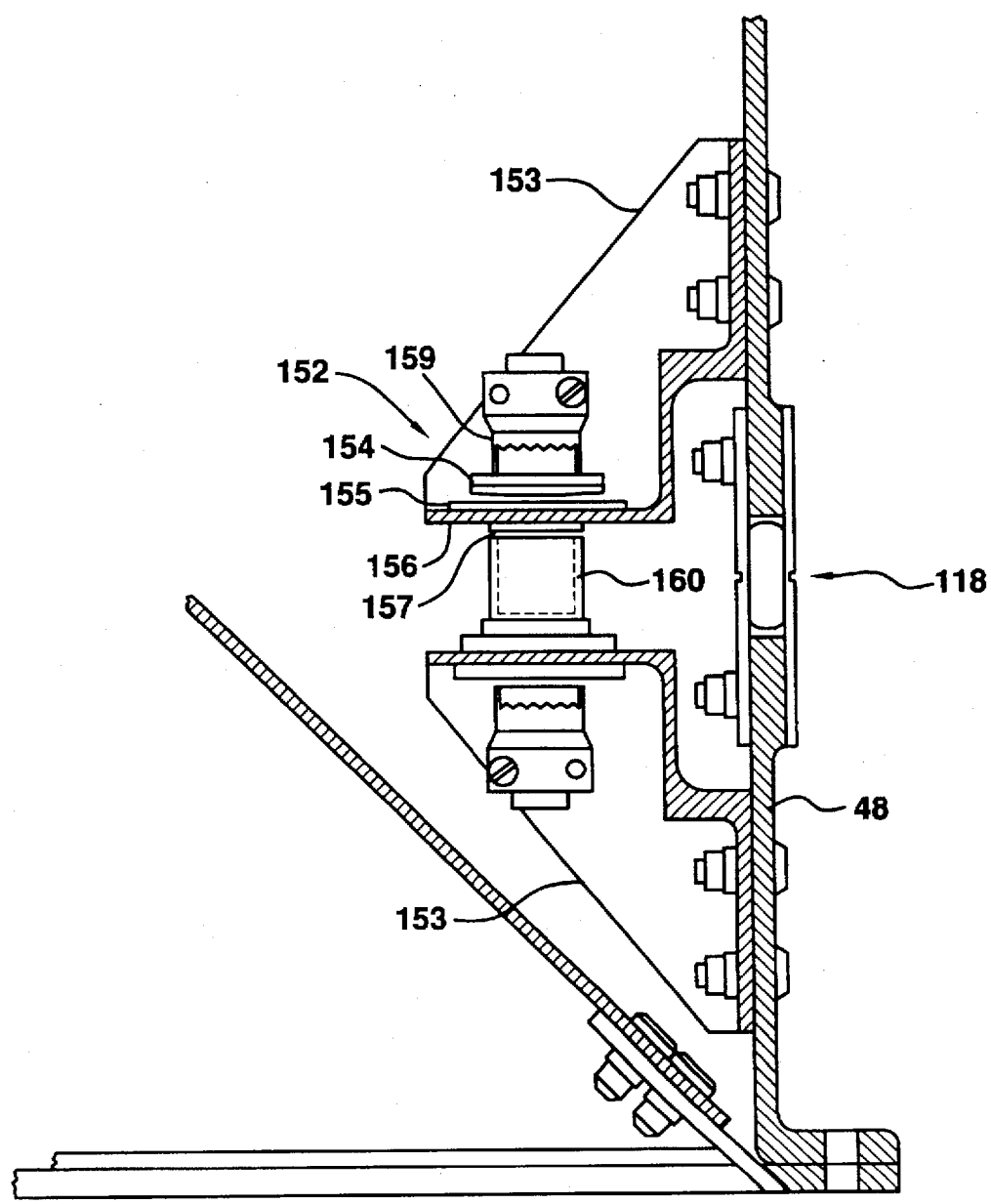
FIG. 20 is a side view of a separation connector for use with the shroud.

The seam 118 further includes separation connectors 152 illustrated in greater detail in FIG. 20. The connectors 152 bridge the seam 118 and are secured to the base ring 46 and the shroud sections 42, 44 by means of brackets 153. Each connector includes a pair of washers 154, a retaining clip 155, a retaining plate 156, and a spring washer 157. The upper portion 159 forms a housing for slidably receiving a piston-like rod 160. The connectors 152 prevent excessive torsional or lateral stresses on the seam 115.

Figure 21:
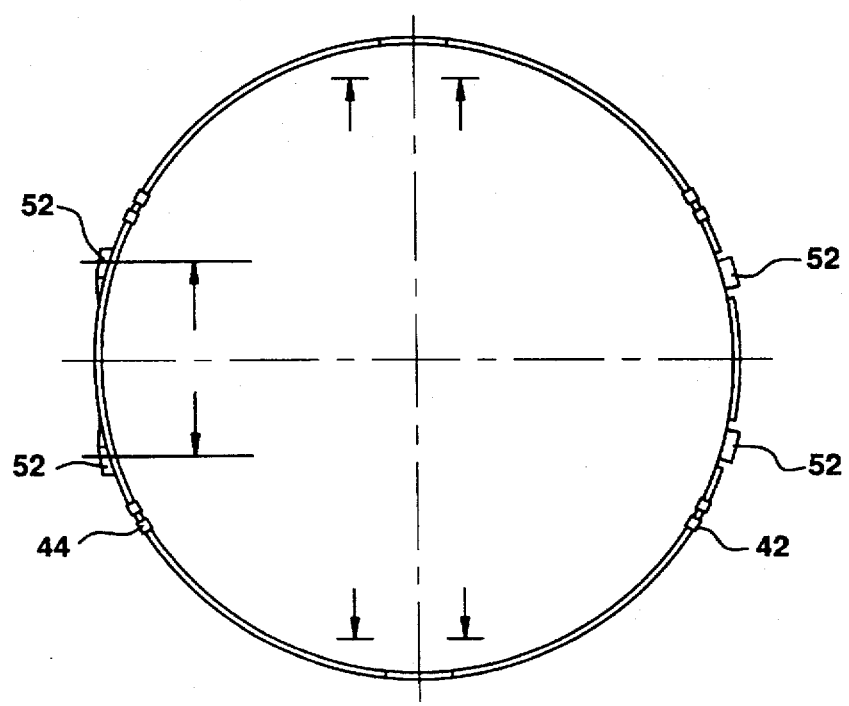
FIG. 21 is a sectional plan view of the shroud showing the thrustor spring positions.

Referring to FIGS. 6 and 21, the hinges 52 secure the lower ends of the two sections 42, 44 at four points. These hinges 52 bridge the gap between the shroud sections 42, 44 and the base ring 46. Thus, when the springs 51 propel the two sections 42 and 44 upwardly, the sections 42, 44 rotate about the pivotal axes of the hinges 52 causing them to flip open in the manner illustrated in FIG. 6.

Figure 22:
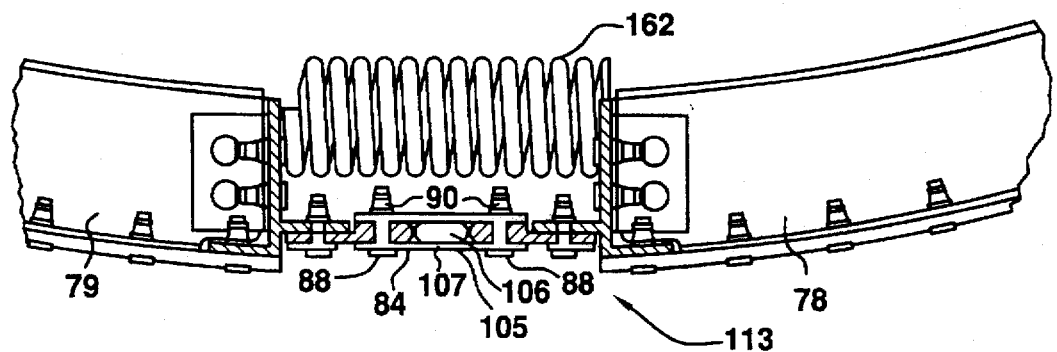
FIG. 22 is a partially sectioned top view of an assistor spring arrangement in an unactivated state, for use with the shroud.
Figure 23:
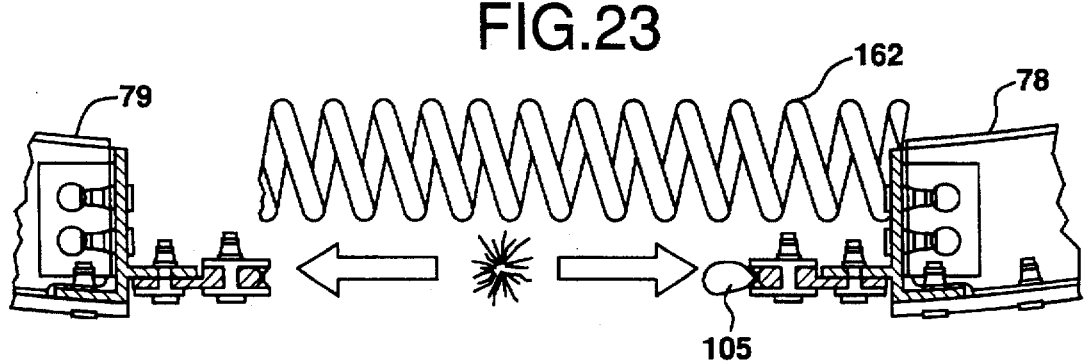
FIG. 23 is a partially sectioned top view of the assistor spring arrangement of FIG. 22, in an activated state.

The pivotal outward movement of the two sections 42, 44 is assisted by means of assistor springs 162 illustrated in FIGS. 22 and 23. The assistor springs 162 are located at the upper ends of the longitudinally extending portions 113 of the seams 50, at opposite sides of the shroud 20, as indicated by reference numeral 163 on FIG. 6. These are 100 lb/inch compression springs having a 1 inch compression. They overcome seal friction and propel the two sections 42, 44 apart once the seams 50 have ruptured.

Figure 25:
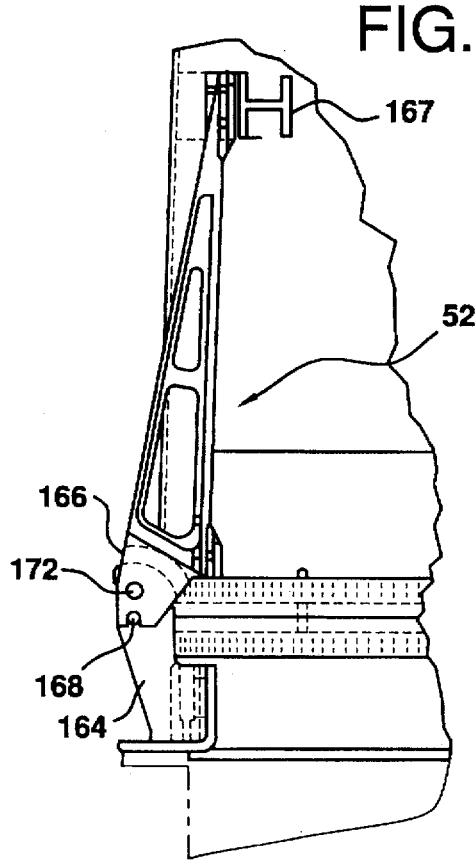
FIG. 25 is a side view of the hinge of FIG. 24 showing the hinge in an assembled condition.
Figure 24:
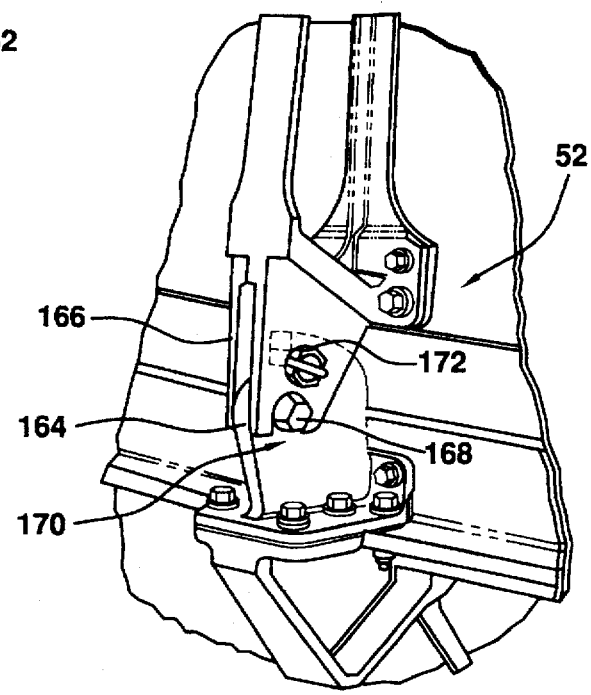
FIG. 24 is a three-dimensional view of a hinge for use with the shroud.
Figure 26:
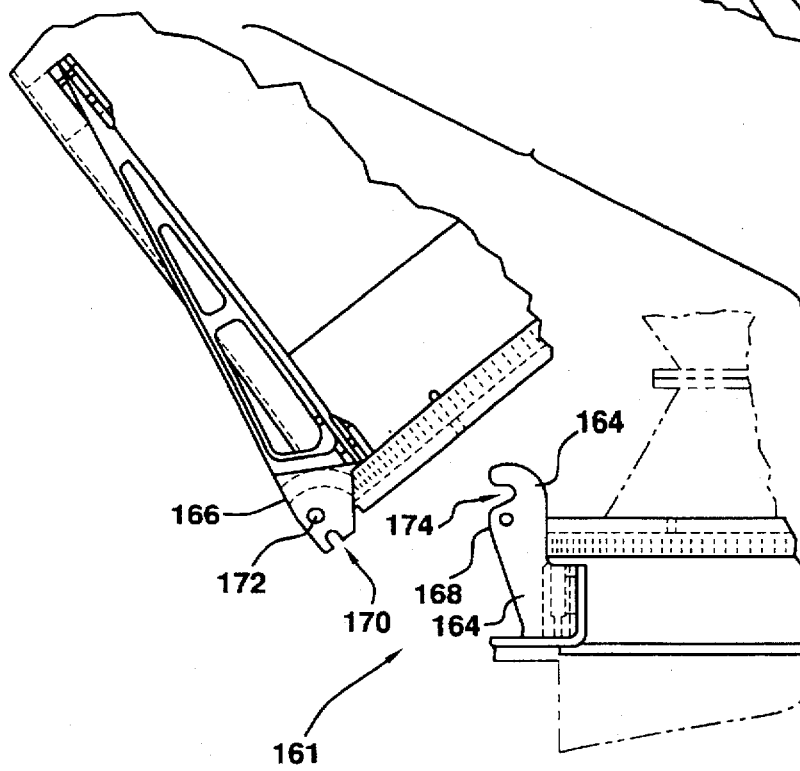
FIG. 26 is a side view of the hinge of FIG. 24 showing the hinge in a dismantled condition.

The hinges 52 are shown in greater detail in FIGS. 24 to 26. Each hinge 154 comprises a lower bracket 164 engageable with an upper bracket 166. The upper bracket is secured to the shroud by means of a support ring 167 as shown in FIG. 25. The brackets 164, 166 are pivotable relative to one another about a pivot point defined by a bolt 168 (FIG. 24). The upper bracket 166 engages the bolt 168 by means of an open-ended slot 170 and is retained relative to the slot while in its unactivated state, by means of a retaining bolt 172. The bolt 172, in turn, engages an open ended slot 174 on the lower bracket 164. Thus as the upper bracket 166 pivots in an anticlockwise direction relative to the lower bracket 164 the bolt 172 disengages from the slot 174, allowing the brackets 164, 166 to be parted from one another as illustrated in FIG. 26.

Although the above shroud separation description refers specifically to the LLV1 embodiment, the description holds also for the other two embodiments.

Figure 27:
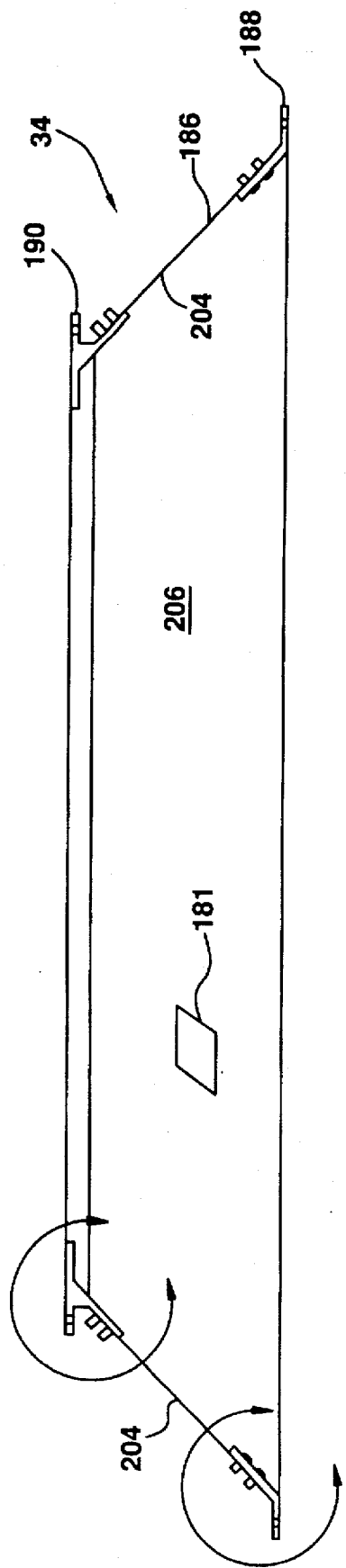
FIG. 27 is a sectional side view of a payload adapter for use with the launch vehicle system.
Figure 28:
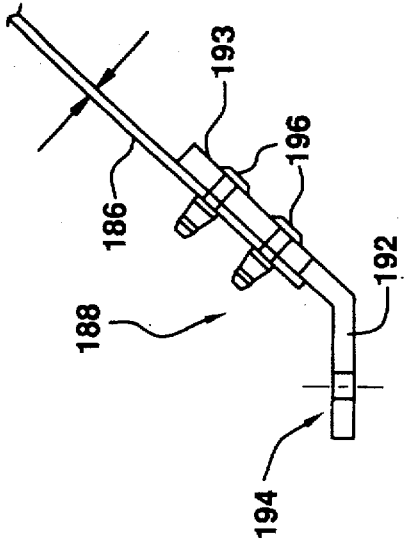
FIG. 28 is a detailed sectional side view of a lower bracket forming part of the payload adapter of FIG. 27.
Figure 32:
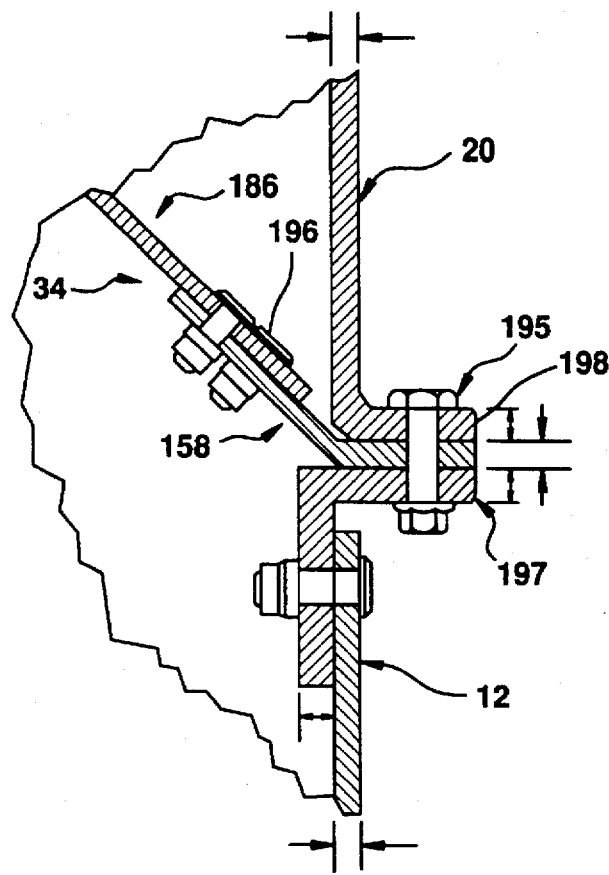
FIG. 32 is a sectional side view of the connection between the shroud, the payload adapter and an OAM.
Figure 33:
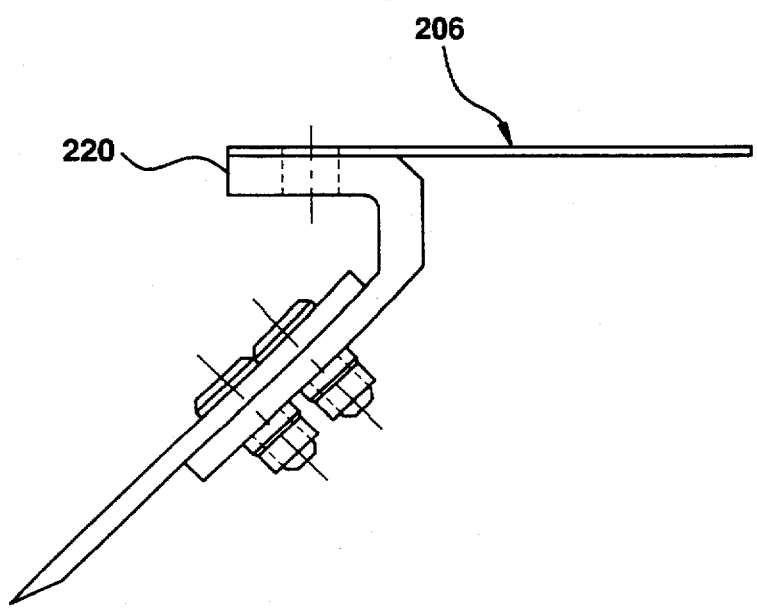
FIG. 33 is a detailed sectional side view of another embodiment of an upper bracket forming part of the payload adapter.

In order to be able to support the payload, irrespective of the nature of the payload, the payload adapter 34, illustrated in FIG. 27, is provided. It includes vents 181 for air flow to the avionics of the OAM 12. The payload adapter 34 consists of a frusto-conical support 186 to which are secured a lower annular bracket 188 and an upper annular bracket 190. The support 186 is made of three plates joined by splice joints 191 (FIG. 33). The brackets 188 and 190 are illustrated in greater detail in FIGS. 28 and 29. The lower bracket 188 defines a base 192 and an upwardly extending frusto-conical portion 193. The base 192 is provided with holes 194 (FIG. 28) forming part of an assembly joint permitting the bracket 188 to be secured to the Orbital Assist Module 12 and the shroud 20 (FIG. 32) by means of bolts 195. The portion 193 is, in turn, secured by means of rivets 196 to the support 186. The assembly joint comprises the connection between the shroud 20, the adapter 34 and the OAM 12. The OAM wall is connected at its upper end to an annular bracket 197 defining an outwardly extending flange having holes formed therein. The holes are aligned with the holes 194 in the bracket 188, the flange of which has a thickness of 0.2 inches. The shroud 20 includes an outwardly extending skirt 198 which is 0.2 inches thick and which also has holes formed in it aligned with the holes 194. This allows the OAM 12, the adapter 34 and shroud 20 to be secured to one another by passing the bolts 195 through the aligned holes and securing them by means of nuts 199.

Figure 29:
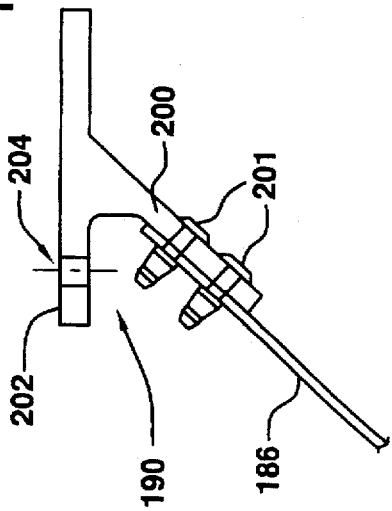
FIG. 29 is a detailed sectional side view of an upper bracket forming part of the payload adapter of FIG. 27.
Figures 30, 31:
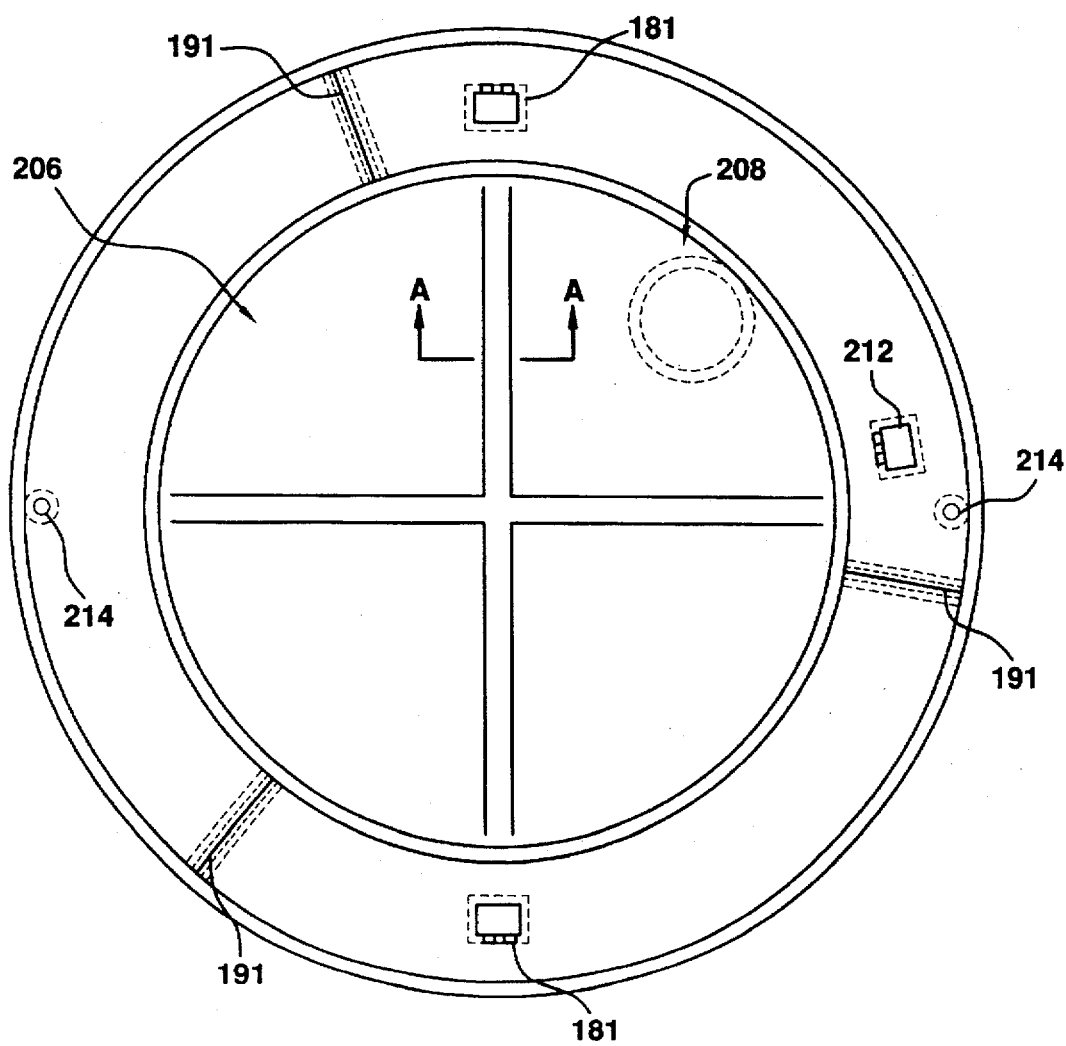
FIG. 30 is a top view of the payload adapter.
FIG. 31 is a cross section through part of the payload adapter of FIG. 30 along line A—A.

The upper end of the adapter 34 is in turn defined by the bracket 190 (FIG. 29). The bracket 190 in cross-section takes the form of an angled T. The downwardly extending body 200 of the T is secured by means of rivets 201 to the support 186. The outer arm of the bracket 190 forms an annular flange 202 and is provided with vertically extending holes 204 for securing the payload or a further adapter to the bracket 190 by means of bolts (not shown). Another embodiment of the upper annular bracket is shown in FIG. 33. A contamination shield 206 is attached to the upper bracket 220. In this embodiment the bracket is V shaped, eliminating the inwardly extending arm of the T-shaped bracket of FIG. 29. The frusto-conical support 186 reduces the 92 inch diameter of the equipment section, defined by the orbital assist module 12, to a 66 inch bolt circle. This interface is compatible with existing LLV-1 payloads and with secondary adapters which several satellite manufacturers have developed for use with other systems. For smaller satellites, the cone can be extended to reduce the diameter even further to be compatible with the 38.8 inch marmon clamp system illustrated in FIGS. 34 to 40 which will be described in detail below. Referring to FIG. 30, the support 186 includes the contamination shield 206 which separates the OAM 12 from the payload. An access port 208, having removable covers, is provided in the shield 206. For greater structural strength the shield includes stiffening ribs 210 as shown in cross section in FIG. 31. Apart from the vents 181, the support 186 includes a vent 212 to permit communication with an IMU bay in the OAM 12. It also includes holes 214 for shroud cables passing to the shroud from the OAM 12. The vents 181, 212 allow cooled air to pass from an air conditioning inlet (not shown) in the shroud to the equipment section of the OAM 12. The air then vents out through ports 218 in the OAM wall having circulated throughout the payload area and equipment section of the OAM 12.

The marmon clamp description below refers to FIGS. 34 to 40 and is related specifically to a payload 22.

Figure 34:
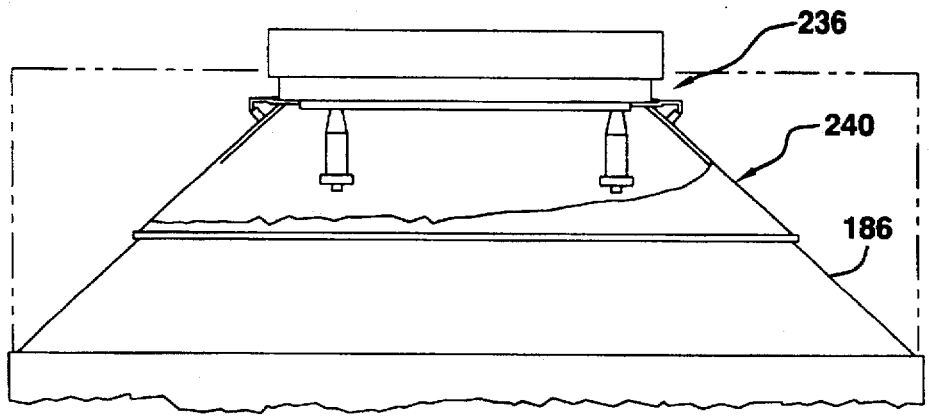
FIG. 34 is a partial cut-away side view of a payload adapter attached to a marmon clamp.
Figure 35:
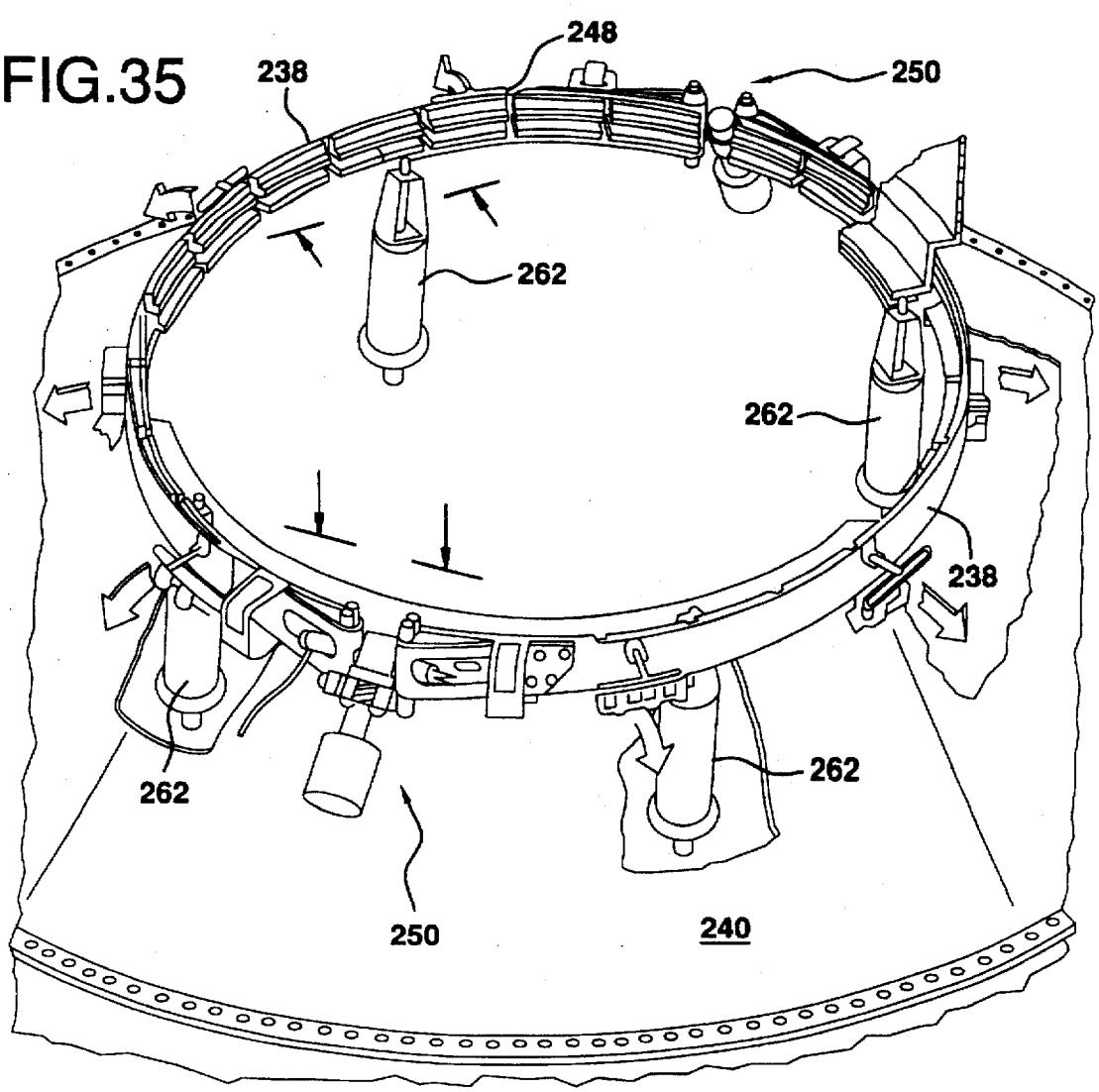
FIG. 35 is a detailed three-dimensional view of a marmon clamp for use with the launch vehicle system.
Figure 36:
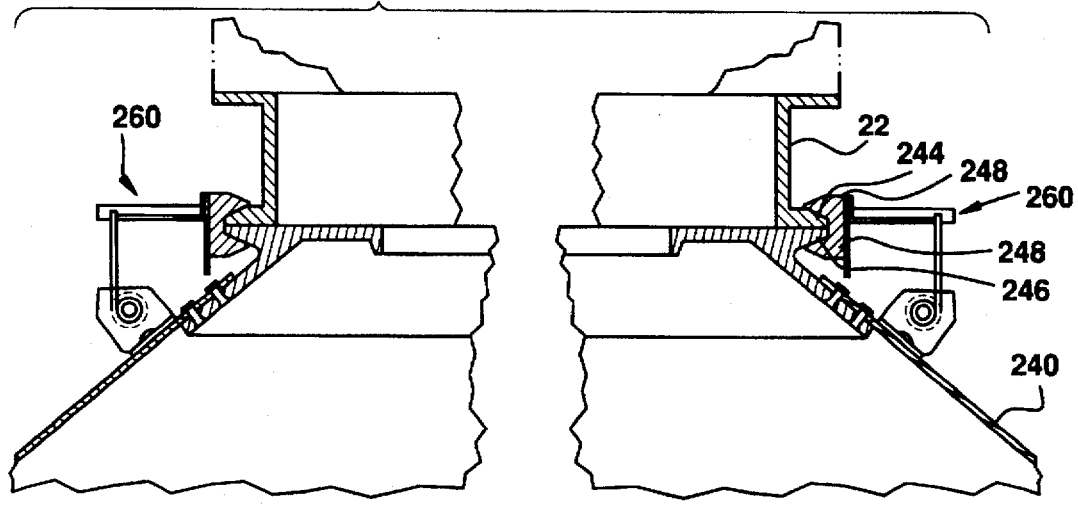
FIG. 36 is a sectional side view of the marmon clamp showing the clamp securing a payload to the payload adapter.
Figure 37:
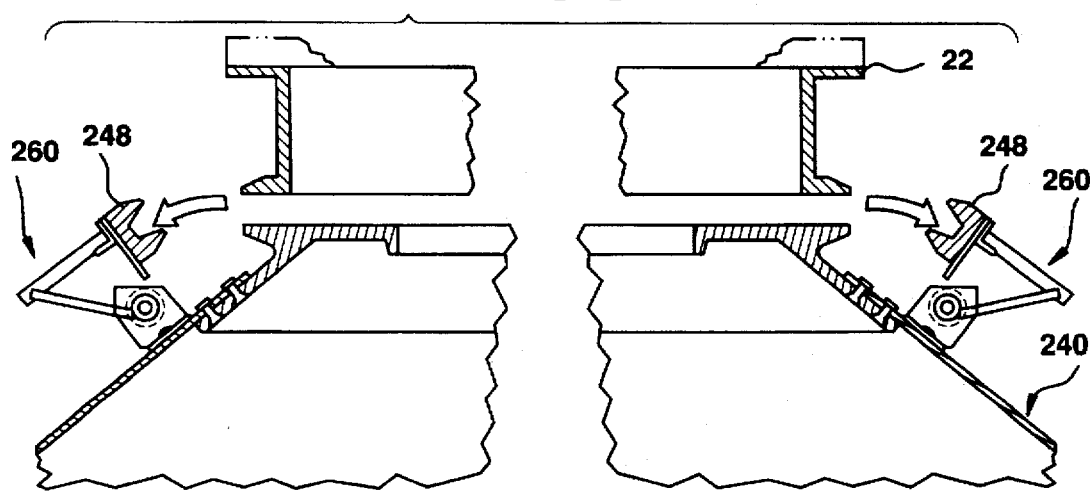
FIG. 37 is a sectional side view of the marmon clamp of FIG. 36 showing the clamp in a released state.
Figure 38:
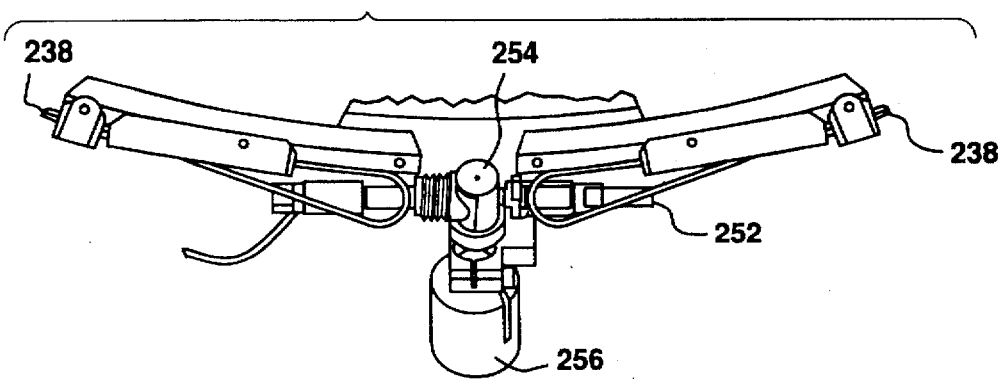
FIG. 38 is a three-dimensional view of part of the marmon clamp of FIG. 36.

The marmon clamp 236 includes an annular spring steal structure 238 formed in two sections which are pivotally secured to the frusto-conical extension 240 of the support 186. The extension 240 is, in turn, connected by means of bolts to the bracket 190 of the frusto-conical support 186 as illustrated in FIG. 34. Looking at FIGS. 36 and 37 it can seen that the payload 22 is provided with a lower annular flange 244 which abuts a complementary flange 246 on the extension 240. The flanges 244 and 246 are held together by brackets 248 secured to the spring steel structure 238. The brackets 248 have complementary inner recesses, to matingly receive the flanges 244, 246. Referring to FIG. 35 the spring steel structure 238 is formed in two sections joined at opposite ends by means of a connector assembly 250 illustrated in greater detail in FIG. 38. A sheerable bolt 252 extends between looped ends of the sections of the spring steel structure 238. An explosive chisel 254 is mounted over the pin 252 and is propelled by means of an explosive charge housed in a housing 256 thereby sheering the bolt 252, when activated. This releases the spring steel structure 238. The sections 238 are biased outwardly and, accordingly the brackets 248 move outwardly on hinged members 260 as illustrated in FIG. 37, thereby releasing the payload 22.

Figure 39:
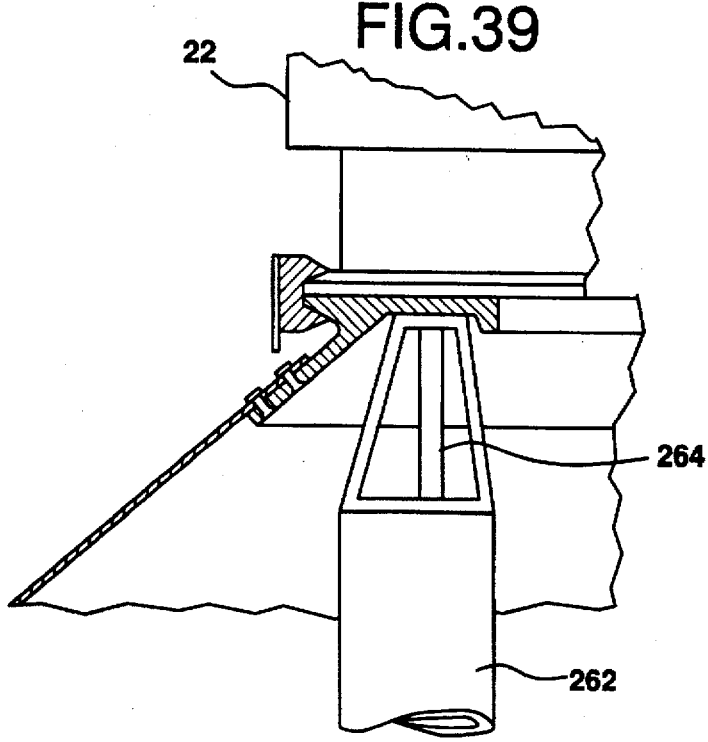
FIG. 39 is a side view of a piston rod arrangement used in conjunction with the marmon clamp, showing the arrangement in an unactivated state.
Figure 40:
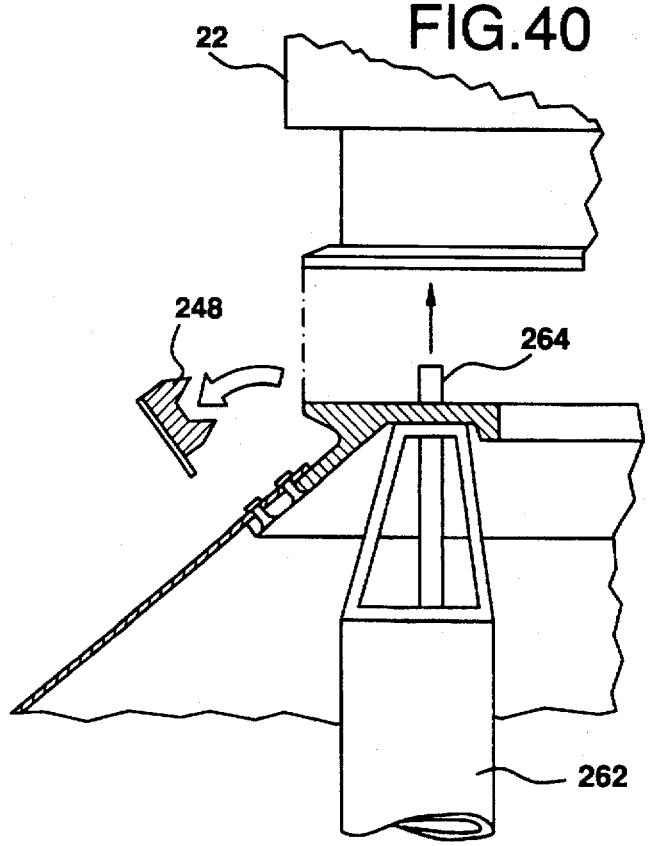
FIG. 40 is a side view of the piston rod arrangement of FIG. 39 showing the arrangement in an activated state.

Referring to FIGS. 39 and 40, a propulsion means 262 is illustrated which includes a piston rod 264 which is biased upwardly by means of suitable force exerting means e.g. a spring or hydraulic mechanism. The clamp 236 includes four such propulsion means 262 as shown in FIG. 35. When the brackets 248 are removed, the payload 22 is propelled upwardly by the rods 264.

While the components described above were described with respect to specific embodiments, it will be appreciated that these were included by way of example only and that the invention is not limited to these specific embodiments.

The invention claimed is:

1. A shroud for a launch vehicle comprising;

a first shell section;

a second shell section connected to the first shell section to form a housing having a closed upper end and an open lower end and defining a payload cavity;

a base ring on which the first and second shell sections are mounted;

a pair of longitudinally extending explosive seam means extending upwardly in a longitudinal plane between the first and second shell sections from the base ring along opposite sides of the housing for connecting the first and second shell sections;

a peripheral explosive seam extending along the periphery of the housing between the base ring and the shell sections in a plane perpendicular to the longitudinal plane;

hinge means for pivotally securing the shell base ring; and spring means for exerting an outward force on the shell sections for pivotal movement of the shell sections relative to the base ring.

2. A shroud of claim 1, in which the spring means comprises at least one pair of thrustor spring assemblies mounted across the peripheral seam, the spring assemblies of each pair being mounted on either side of respective ones of the longitudinally extending explosive seams for exerting a repelling force between the base ring and the shroud sections.

3. A shroud of claim 1, in which the spring means comprises assistor spring means mounted across at least one of the longitudinally extending explosive seams for exerting a repelling force between the two shell sections.

4. A shroud of claim 2, wherein each thrustor spring means includes at least one spring having an upper end and a lower end, in which the upper end is secured relative to one of the shell sections and in which a thrustor bar is secured to the lower end of the spring, the bar being movably mounted relative to said shell section to engage the base ring thereby to exert a force between the shell section and the base ring.

5. A shroud of claim 4, wherein the thrustor bar has a lower foot complementarily engageable with a support base secured to the base ring.

6. A shroud of claim 4, wherein the spring means includes four pairs of thrustor spring assemblies, the pairs being mounted across the peripheral seam, on either side of each of the two longitudinally extending seams.

7. A shroud of claim 3, wherein the assistor spring means comprises two helical compression springs mounted across the longitudinally extending seams on opposite sides of the housing, each spring having a first and a second end, the first end being secured to one of the shell sections.

8. A shroud of claim 1, wherein the hinge means for each shell section comprises at least one hinge which includes a first hinge plate having a retaining slot means defined therein; a pivot pin mounted on the first hinge plate; and a second hinge plate having a pivot slot formed therein engageable with the pivot pin, the second plate being pivotable relative to the first plate about the pivot pin between an engaged positioned and a disengaged position, the second plate further including a retaining pin mounted thereon and engageable with the retaining slot means when the second plate is in its engaged position, to retain the pivot slot of the second plate relative to the pivot pin.

9. A shroud of claim 8, wherein the hinge means for each shell section comprises a pair of hinges, the pivotal axes of the pivot pins lying on a common straight line.

10. A shroud of claim 1, wherein the longitudinally extending explosive seams comprise a plurality of longitudinally extending seam elements, ends of which are connected to one another to form the seams, each element comprising a pair of brackets attached to opposed ends of the first and second shell sections; and a pair of opposed plates connecting the brackets, in which the plates have zones of weakening extending longitudinally along the plates and wherein the plates are spaced apart by the brackets and the brackets are spaced from each other by the plates to define a longitudinally extending cavity, each longitudinally extending explosive seam further including a deformable tube extending along the cavities of its elements; explosive material housed in the tubes; and at least one detonating means for detonating the explosive material.

11. A shroud of claim 10, wherein the explosive material takes the form of an explosive cord extending within each deformable tube.

12. A shroud of claim 1, wherein the peripherally extending explosive seam comprises a plurality of peripherally extending seam elements, ends of which are connected to one another to form the seams, each element comprising a pair of brackets attached to opposed ends of the upper and lower shell portions; and a pair of opposed plates connecting the brackets, in which the plates have zones of weakening extending peripherally along the plates to provide a zone of weakening extending along the seam and wherein the plates are spaced apart by the brackets and the brackets are spaced from each other by the plates to define a peripherally extending cavity, the peripherally extending explosive seam further including a deformable tube extending along the cavities of the elements; explosive material housed in the tube; and at least one detonating means for detonating the explosive material.

13. A shroud of claim 12 wherein the explosive material takes the form of an explosive cord extending within the deformable tube.

14. A launch vehicle payload housing comprising, a first shell section;

a second shell section connected to the first shell section to form a housing which has a closed upper end and an open lower end and which defines a payload cavity;

a base ring on which the first and second shell sections are mounted;

a pair of longitudinally extending explosive seam means extending upwardly in a longitudinally plane between the first and second shell sections from the base ring along opposite sides of the housing for connecting the first and second shell sections;

a peripheral explosive seam extending along the periphery of the housing between the base ring and the shell sections in a plane perpendicular to the longitudinal plane;

hinge means for pivotally securing the shell sections to the base ring;

spring means for exerting an outward force on the shell sections for pivotal movement of the shell sections relative to the base ring; and a payload adapter means connected to the base ring for supporting a payload.

15. A launch vehicle payload housing of claim 14, in which the payload adapter means comprises a frusto-conical support defined by a frusto-conically shaped wall and having connecting means at its ends for connecting the narrow end of the support to a payload or a secondary adapter, and the wide end of the support to the base ring.

16. A launch vehicle payload housing of claim 15, in which each connecting means includes an annular bracket having a radially outwardly extending flange with axially extending holes defined in the flange and spaced circumferentially along the flange.

17. A launch vehicle payload housing of claim 15, in which the frusto-conical support includes at least one air vent extending through the wall of the support.

18. A launch vehicle payload housing of claim 15, in which the payload adapter means includes a contamination shield secured to the smaller diameter side of the support.

19. A launch vehicle payload housing of claim 18, wherein the shield includes strengthening ribs and defines ports to permit communication through the shield.

\* \* \* \* \*